United States Patent
Hasnine et al.

(10) Patent No.: US 11,577,343 B2
(45) Date of Patent: *Feb. 14, 2023

(54) LOW-SILVER ALTERNATIVE TO STANDARD SAC ALLOYS FOR HIGH RELIABILITY APPLICATIONS

(71) Applicant: ALPHA ASSEMBLY SOLUTIONS INC., Waterbury, CT (US)

(72) Inventors: Md Hasnine, Glenview, IL (US); Lik Wai Kho, Glenview, IL (US)

(73) Assignee: ALPHA ASSEMBLY SOLUTIONS INC., Waterbury, CT (US)

( * ) Notice: Subject to any disclaimer, the term of this patent is extended or adjusted under 35 U.S.C. 154(b) by 140 days.

This patent is subject to a terminal disclaimer.

(21) Appl. No.: 16/022,337

(22) Filed: Jun. 28, 2018

(65) Prior Publication Data
US 2019/0134758 A1 May 9, 2019

Related U.S. Application Data

(60) Provisional application No. 62/583,934, filed on Nov. 9, 2017.

(51) Int. Cl.
*B23K 35/26* (2006.01)
*C22C 13/02* (2006.01)
(Continued)

(52) U.S. Cl.
CPC ............ *B23K 35/262* (2013.01); *B23K 35/00* (2013.01); *B23K 35/025* (2013.01);
(Continued)

(58) Field of Classification Search
CPC ...... B23K 35/262; B23K 35/00; B23K 35/26; B23K 35/0227; B23K 35/0244; B23K 35/025; C22C 13/00; C22C 13/02
See application file for complete search history.

(56) References Cited

U.S. PATENT DOCUMENTS 6,176,947 B1   1/2001  Hwang et al.
9,780,055 B2  10/2017  Yamanaka et al.
(Continued)

FOREIGN PATENT DOCUMENTS

CN    1785579 A  *  6/2006
JP  2011-251310 A  12/2011
(Continued)

OTHER PUBLICATIONS

International Search Report, PCT/US2018/058463, dated Feb. 5, 2019, 6 pages.
(Continued)

*Primary Examiner* — Anthony J Zimmer
*Assistant Examiner* — Dean Mazzola
(74) *Attorney, Agent, or Firm* — Stinson LLP

(57) ABSTRACT

A lead-free solder alloy may comprise tin, silver, copper, bismuth, cobalt, and antimony. The alloy may further comprise nickel. The silver may be present in an amount from about 2.0% to 2.8% by weight of the solder. The copper may be present in an amount from about 0.2% to 1.2% by weight of the solder. The bismuth may be present in an amount from about 0.0% to about 5.0% by weight of the solder. In some embodiments, the bismuth may be present in an amount from about 1.5% to 3.2% by weight of the solder. The cobalt may be present in an amount from about 0.001% to about 0.2% by weight of the solder. The antimony may be present in an amount between about 0.0% to about 0.1% by weight of the solder. The balance of the solder is tin.

12 Claims, 23 Drawing Sheets
(1 of 23 Drawing Sheet(s) Filed in Color)

(51) Int. Cl.
  *B23K 35/00* (2006.01)
  *B23K 35/02* (2006.01)
(52) U.S. Cl.
  CPC ...... *B23K 35/0227* (2013.01); *B23K 35/0244* (2013.01); *C22C 13/02* (2013.01)

(56) References Cited

U.S. PATENT DOCUMENTS

| | | | |
|---|---|---|---|
| 2002/0117539 A1* | 8/2002 | Ito ..................... | B23K 35/262 228/254 |
| 2009/0232696 A1* | 9/2009 | Ohnishi et al. ......... | C22C 13/00 420/561 |
| 2010/0297470 A1* | 11/2010 | Munekata ............. | B23K 35/22 428/646 |
| 2012/0223430 A1* | 9/2012 | Terashima et al. ..... | H01L 24/13 257/738 |
| 2014/0054766 A1* | 2/2014 | Hashino ............... | B23K 35/025 257/737 |
| 2014/0141273 A1* | 5/2014 | Shimamura et al. ....................... | B23K 35/262 428/576 |
| 2015/0221606 A1* | 8/2015 | Yamanaka et al. .. | H05K 3/3457 228/256 |
| 2015/0224604 A1 | 8/2015 | Choudhury et al. | |
| 2016/0056570 A1 | 2/2016 | Yoshikawa et al. | |
| 2016/0279741 A1 | 9/2016 | Ukyo et al. | |
| 2017/0066089 A1 | 3/2017 | Maalekian et al. | |
| 2017/0355043 A1* | 12/2017 | Ikeda ................... | B23K 35/262 |
| 2018/0029169 A1* | 2/2018 | Arai et al. ........... | B23K 35/262 |
| 2018/0102464 A1* | 4/2018 | de Avila Ribas .... | B23K 1/0016 |
| 2018/0214989 A1* | 8/2018 | Ikeda ................... | B23K 35/025 |

FOREIGN PATENT DOCUMENTS

| | | | |
|---|---|---|---|
| JP | 2015020182 A | 2/2015 | |
| JP | 2016019992 A | 2/2016 | |
| WO | WO-2011102034 A1 * | 8/2011 | ............. C22C 13/00 |
| WO | 2014057261 A1 | 4/2014 | |
| WO | WO-2017164194 A1 * | 9/2017 | ............. C22C 13/02 |

OTHER PUBLICATIONS

Written Opinion, PCT/US2018/058463, dated Feb. 5, 2019, 10 pages.
International Preliminary Report on Patentability, PCT/US2018/058463, dated May 12, 2020, 11 pages.

* cited by examiner

LOW-SILVER ALTERNATIVE TO STANDARD SAC ALLOYS FOR HIGH RELIABILITY APPLICATIONS

CROSS REFERENCE TO RELATED APPLICATIONS

The present application claims the benefit of U.S. Provisional Patent Application No. 62/583,934, filed Nov. 9, 2017, the entire contents of which are incorporated herein by reference.

FIELD

The present disclosure generally relates to lead-free solder alloys for electronic applications.

BACKGROUND

Solder alloys are widely used for manufacturing and assembly a variety of electronic devices. Traditionally, solder alloys have been tin-lead based alloys. Tin-lead based alloys were used to prepare solder with desired materials properties, including a suitable melting point and pasty range, wetting properties, ductility, and thermal conductivities. However, lead is a highly toxic, environmentally hazardous material that can cause a wide range of harmful effects. As a result, research has focused on producing lead-free solder alloys with desired materials properties.

The present disclosure relates to a low-silver lead-free solder alloy providing a lower undercooling temperature and improved solder joint drop/shock reliability. The alloy maintains the thermal cyclic performance relative to certain prior art alloys—including an alloy comprising 96.5 wt. % tin, 3.0% silver, and 0.5 wt. % copper ("SAC305")—while allowing for lower process temperature and reduced aging effects during exposure to high temperatures.

SUMMARY

According to one aspect of the present disclosure, a lead-free alloy comprises: 2.0 to 2.8 wt. % silver, 0.2 to 1.2 wt. % copper; 0.0 to 5.0 wt. % bismuth; 0.001 to 0.2 wt. % cobalt; 0.0 to 0.1 wt. % antimony; and balance tin, together with any unavoidable impurities. Optionally, the alloy may further comprise 0.01 to 0.1 wt. % nickel.

According to another aspect of the present disclosure, a lead-free alloy comprises: 2.4 to 2.6 wt. % silver, 0.5 to 0.8 wt. % copper; 1.5 to 3.2 wt. % bismuth; 0.03 to 0.05 wt. % cobalt; 0.03 to 0.07 wt. % antimony; and balance tin, together with any unavoidable impurities. Optionally, the alloy may further comprise 0.03 to 0.07 wt. % nickel.

According to another aspect of the present disclosure, a lead-free alloy comprises: 2.5 wt. % silver, 0.75 wt. % copper; 3.0 wt. % bismuth; 0.03 wt. % cobalt; 0.05 wt. % antimony; and balance tin, together with any unavoidable impurities. Optionally, the alloy may further comprise 0.05 wt. % nickel.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The following is a description of the examples depicted in the accompanying drawings. The figures are not necessarily to scale, and certain features and certain views of the figures may be shown exaggerated in scale or in schematic in the interest of clarity or conciseness.

Figure 1B:
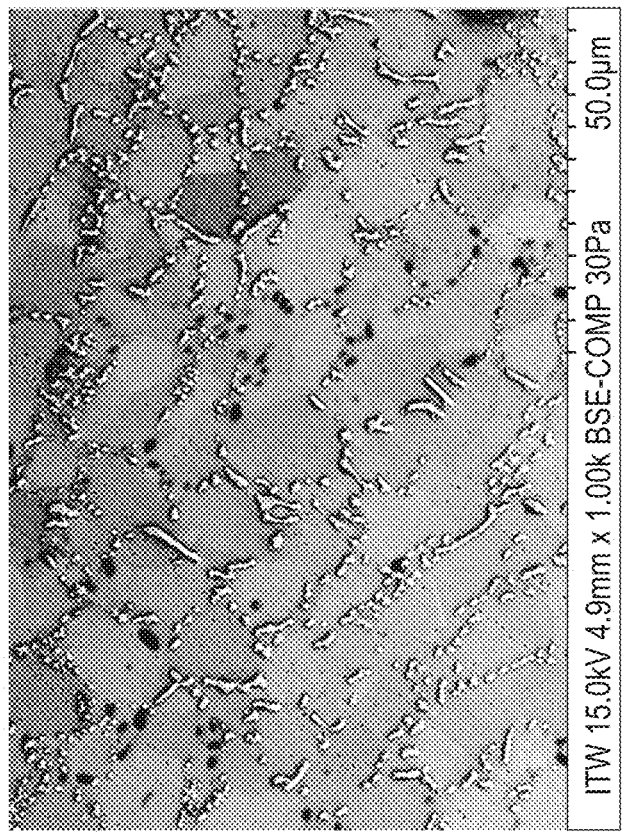
FIG. 1B is a SEM micrograph of a prior art SAC305 alloy that has been aged at 125° C. for 24 hours.

The foregoing summary, as well as the following detailed description, will be better understood when read in conjunction with the figures. It should be understood that the claims are not limited to the arrangements and instrumentality shown in the figures.

DETAILED DESCRIPTION

In the following detailed description, specific details may be set forth in order to provide a thorough understanding of embodiments of the present disclosure. However, it will be clear to one skilled in the art when disclosed examples may be practiced without some or all of these specific details. For the sake of brevity, well-known features or processes may not be described in detail. In addition, like or identical reference numerals may be used to identify common or similar elements.

Novel lead-free solder alloy compositions that are suitable for a variety of electronics applications, particularly in portable electronic devices, are described below. These solder alloy compositions may be used in various forms. For example, the solder alloy compositions may be used in the form of a bar, wire, solder powder, solder paste, or another predetermined preform. These solder alloy compositions are tin based, in particular tin-silver-copper (sometimes referred to as "SAC") based.

The present disclosure relates to low silver lead-free solder alloys that exhibit a reduced undercooling temperature, reduced process temperature, reasonable wetting and spreading performance, improved thermal cycle and drop/shock impact reliability, and reduced aging effects during high temperature exposure (as compared to certain prior art alloys). Such solder alloys may be used in portable electronic devices such as mobile phones and cameras.

The thermal cycle and drop/shock reliability of tin-silver-copper solder depends on the silver content in the solder. High silver content (≥3%) tends to provide better thermal cyclic reliability but relatively poor drop/shock performance, whereas while low silver content (≤2%) tends to demonstrate the opposite—worse thermal cyclic reliability but relatively good drop/shock performance. As a result, there is need to develop tin-silver-copper solder compositions that exhibit both good thermal cycling and good drop/shock reliability.

The addition of a small amount of cobalt to tin-silver-copper solder (containing ≤3% silver by weight) significantly reduces the undercooling temperature and reduces the formation of large $Ag_3Sn$ platelets (the formation of which could otherwise lead to poor mechanical performance) as compared to certain prior art alloys. Further, the synergistic effect of adding bismuth and a low amount of silver improves the solder's drop/shock reliability while maintaining the thermal cyclic performance equivalent to prior art alloys such as SAC305. The addition of bismuth reduces the melting temperature of the solder to be approximately 6-10° C. lower than the melting temperature of SAC305. This allows the process temperature to be limited, which reduces the potential warpage (deformation) of the printed circuit board upon which the solder is deposited. Indeed, one major concern when using SAC305 solder is that the higher process temperature may damage the board material and components during assembly. In addition, the overall mechanical strength of the solder joint is improved. Therefore, the low silver lead-free solder compositions disclosed here exhibit a reduced undercooling temperature, reduced process temperature, and improved thermal cycle and drop/shock impact reliability simultaneously.

The compositions shown in Tables 1 and 2 have been found to exhibit desirable properties that are superior to certain prior art alloys, including SAC305.

Table 1 provides several compositions according to the present disclosure that comprise tin, silver, copper, bismuth, cobalt, and antimony. Optionally, these compositions may additionally comprise nickel.

TABLE 1

| Element | Composition Range 1.1 (wt. %) | Composition Range 1.2 (wt. %) | Composition Range 1.3 (wt. %) | Composition Range 1.4 (wt. %) | Composition Range 1.5 (wt. %) |
| --- | --- | --- | --- | --- | --- |
| Silver (Ag) | 2.0-2.8 | 2.0-2.8 | 2.0-2.5 | 2.0-2.5 | 2.0-2.5 |
| Copper (Cu) | 0.2-1.2 | 0.2-1.2 | 0.2-1.2 | 0.2-1.2 | 0.5-0.8 |
| Bismuth (Bi) | 0.0-5.0 | 0.0-5.0 | 1.5-3.2 | 1.5-3.2 | 1.5-3.2 |
| Cobalt (Co) | 0.001-0.2 | 0.001-0.2 | 0.001-0.2 | 0.001-0.2 | 0.03-0.05 |

TABLE 1-continued

| Element | Composition Range 1.1 (wt. %) | Composition Range 1.2 (wt. %) | Composition Range 1.3 (wt. %) | Composition Range 1.4 (wt. %) | Composition Range 1.5 (wt. %) |
|---|---|---|---|---|---|
| Antimony (Sb) | 0.0-0.1 | 0.0-0.1 | 0.0-0.1 | 0.0-0.1 | 0.0-0.1 |
| Nickel (Ni) | | 0.01-0.1 | | 0.01-0.05 | 0.01-0.05 |
| Tin (Sn) | Balance | Balance | Balance | Balance | Balance |

Table 2 provides several more compositions according to the present disclosure, shown as specific examples.

TABLE 2

| Element | Example 2.1 (wt. %) | Example 2.2 (wt. %) | Example 2.3 (wt. %) | Example 2.4 (wt. %) | Example 2.5 (wt. %) |
|---|---|---|---|---|---|
| Silver (Ag) | 2.5 | 2.5 | 2.5 | 2.0 | 2.5 |
| Copper (Cu) | 0.75 | 0.75 | 0.75 | 0.75 | 0.75 |
| Bismuth (Bi) | 1.5 | 3.0 | 3.0 | 3.0 | 3.0 |
| Cobalt (Co) | | | 0.03 | 0.03 | 0.03 |
| Antimony (Sb) | 0.05 | 0.05 | 0.05 | 0.05 | 0.05 |
| Nickel (Ni) | | | | 0.05 | 0.05 |
| Tin (Sn) | Balance | Balance | Balance | Balance | Balance |

Controlled additions of bismuth (Bi), antimony (Sb), cobalt (Co), and/or nickel (Ni) to a tin-silver-copper (Sn—Ag—Cu) system are used to refine the alloy's grain structure and increase the alloy's mechanical strength. More specifically, cobalt may be added to the alloy to refine the grain structure and reduce the undercooling temperature. As additives to a tin-silver-copper system, bismuth and antimony both dissolve in tin and may be added to the alloy to provide solid solution strengthening and thus improve the alloy's mechanical properties and any resulting solder joint's thermal cyclic reliability, particularly in harsh environments. Also, bismuth decreases the solidus temperature of the alloy and reduces its surface tension, thus improving the wettability. Antimony increases the mechanical strength of the alloy. In small amounts (0-0.09 wt. %), adding antimony does not affect the melting characteristics of the alloy. In greater amounts, the addition of antimony may increase the melting temperature of the alloy. Optionally, nickel may be added to improve further the mechanical properties of the alloy. In addition, elements such as germanium or phosphorus may be added to improve the alloy's oxidation resistance. The proper synergy between the mechanisms described above, which is achieved though the specific composition ranges claimed in the instant application, optimizes the alloy's mechanical properties and any resulting solder joints' resistance to thermal cycles and drop/shock impact reliability, particularly in mobile electronic applications.

Figure 1A:
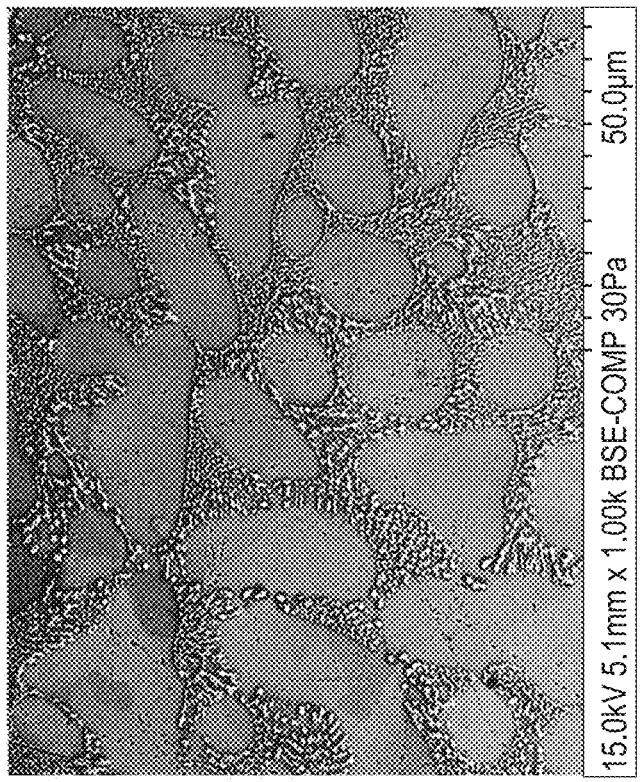
FIG. 1A is a SEM micrograph of a prior art SAC305 alloy in as cast condition.
Figure 2A:
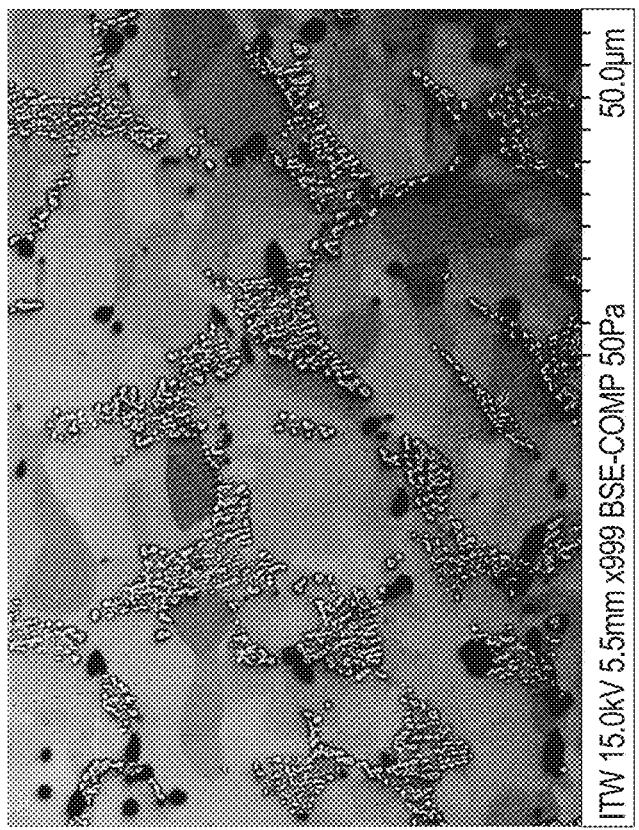
FIG. 2A is a SEM micrograph of an alloy according to the present disclosure in as cast condition.
Figure 2B:
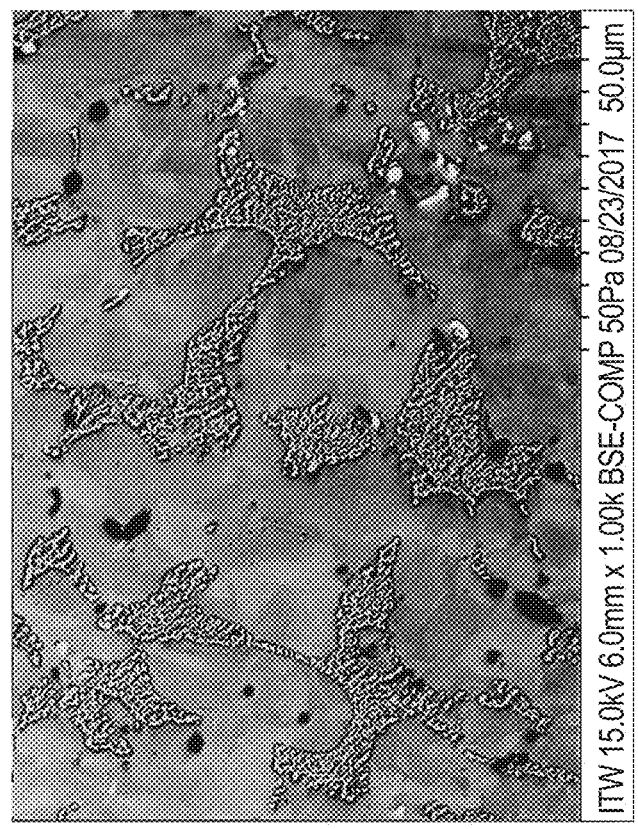
FIG. 2B is a SEM micrograph of an alloy according to the present disclosure that has been aged at 125° C. for 24 hours.

FIGS. 1A and 1B show scanning electron microscope ("SEM") micrographs of areas of the surface of a prior art SAC305 alloy comprising 96.5 wt. % tin, 3.0% silver, and 0.5 wt. % copper. FIGS. 2A and 2B show SEM micrographs of areas of the surface of an alloy according to the composition of Example 2.3 shown in Table 2. FIGS. 1A and 2A show the alloys as cast; whereas FIGS. 1B and 2B show the alloys after aging for 24 hours at a temperature of 125° C. As can be seen from the SEM micrographs, the grain structure of the SAC305 alloy (shown in FIGS. 1A and 1B) coarsens during aging at an elevated temperature. In contrast, the Example 2.3 alloy maintains its finer, more uniform grain structure during aging at 125° C. (compare FIG. 2A to FIG. 2B). The microstructure contains $Ag_3Sn$ and $Cu_6Sn_5$ precipitates, and bismuth and antimony each dissolve in the tin matrix, which provides solid solution strengthening. Cobalt acts as a micro-alloying element to refine the microstructure. The finely distributed $Ag_3Sn$ and $Cu_6Sn_5$ precipitates and solid solution strengthening stabilize the microstructure during aging at an elevated temperature.

Figure 3:
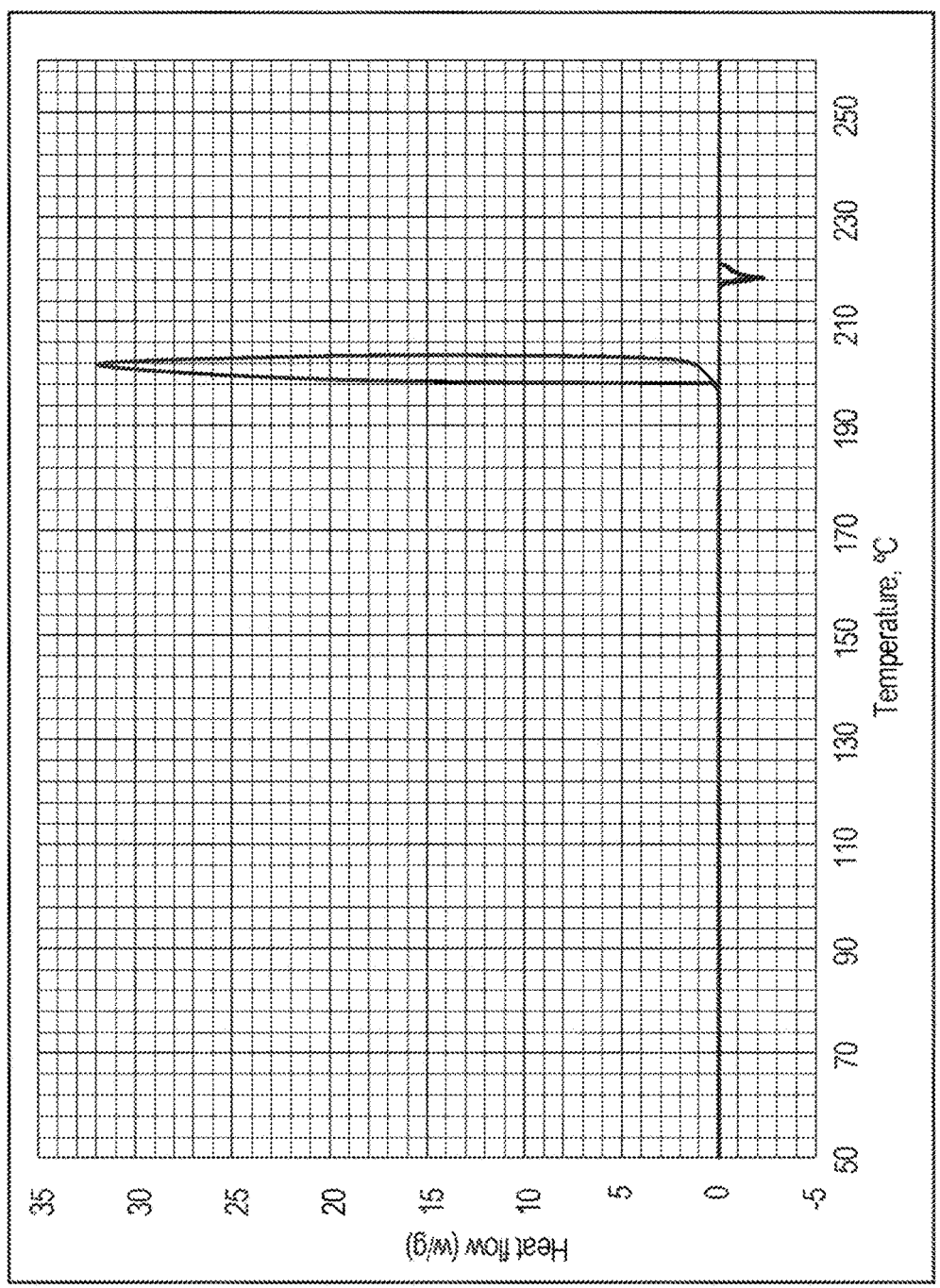
FIG. 3 is a differential scanning calorimetry (DSC) chart for a prior art SAC305 alloy.
Figure 4:
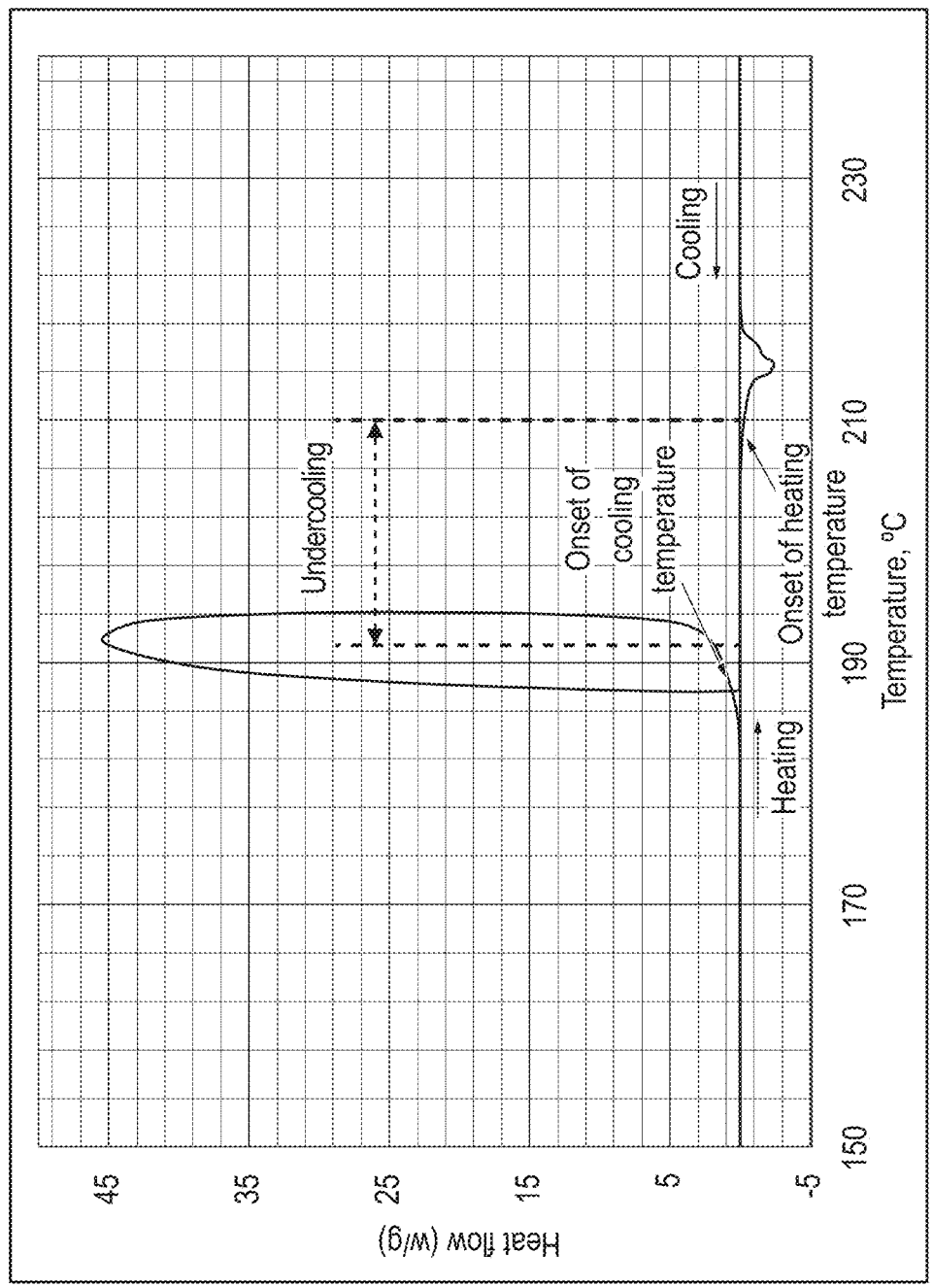
FIG. 4 is a differential scanning calorimetry (DSC) chart for an alloy according to the present disclosure.
Figure 5:
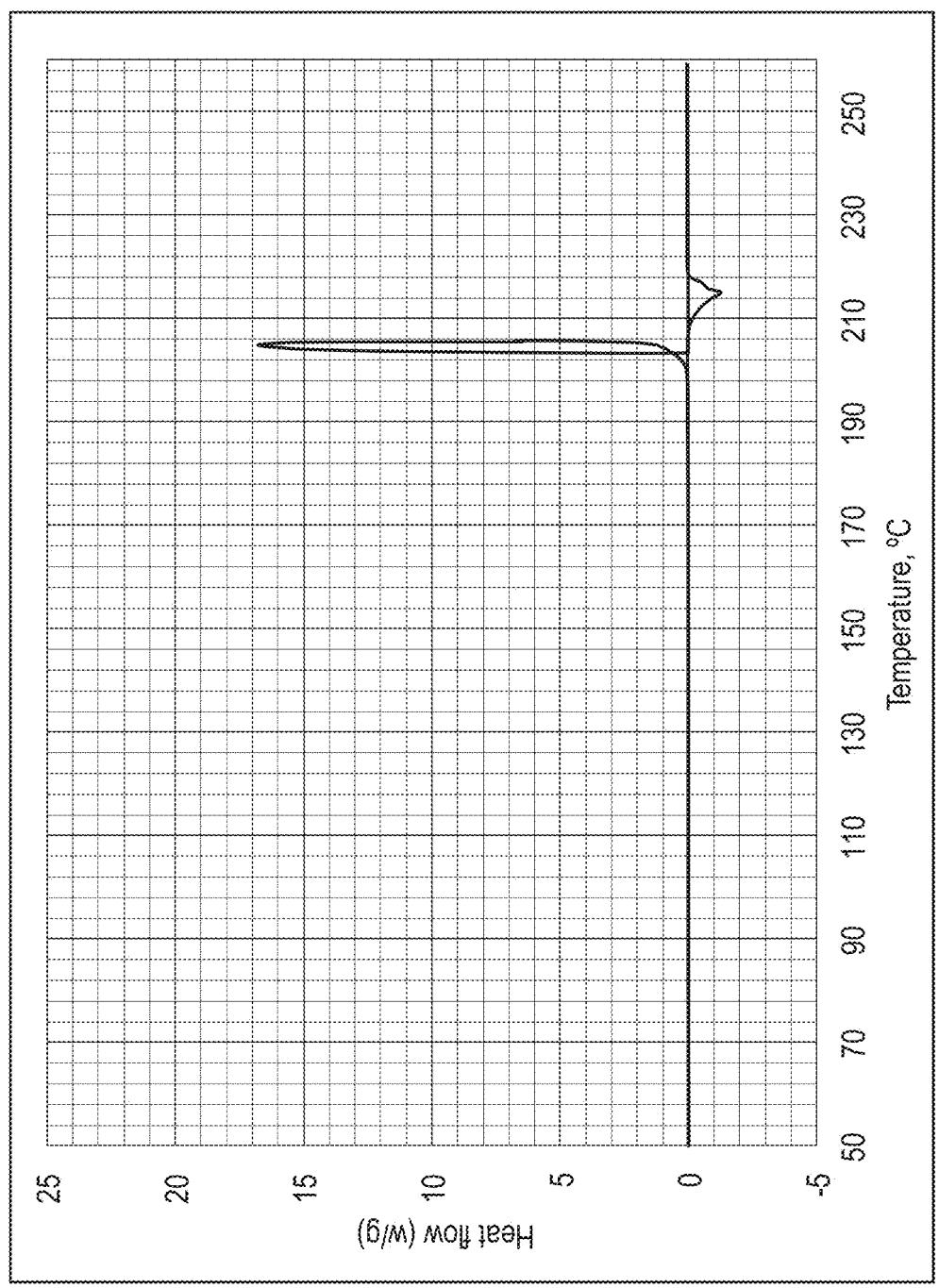
FIG. 5 is a differential scanning calorimetry (DSC) chart for an alloy according to the present disclosure.
Figure 6:
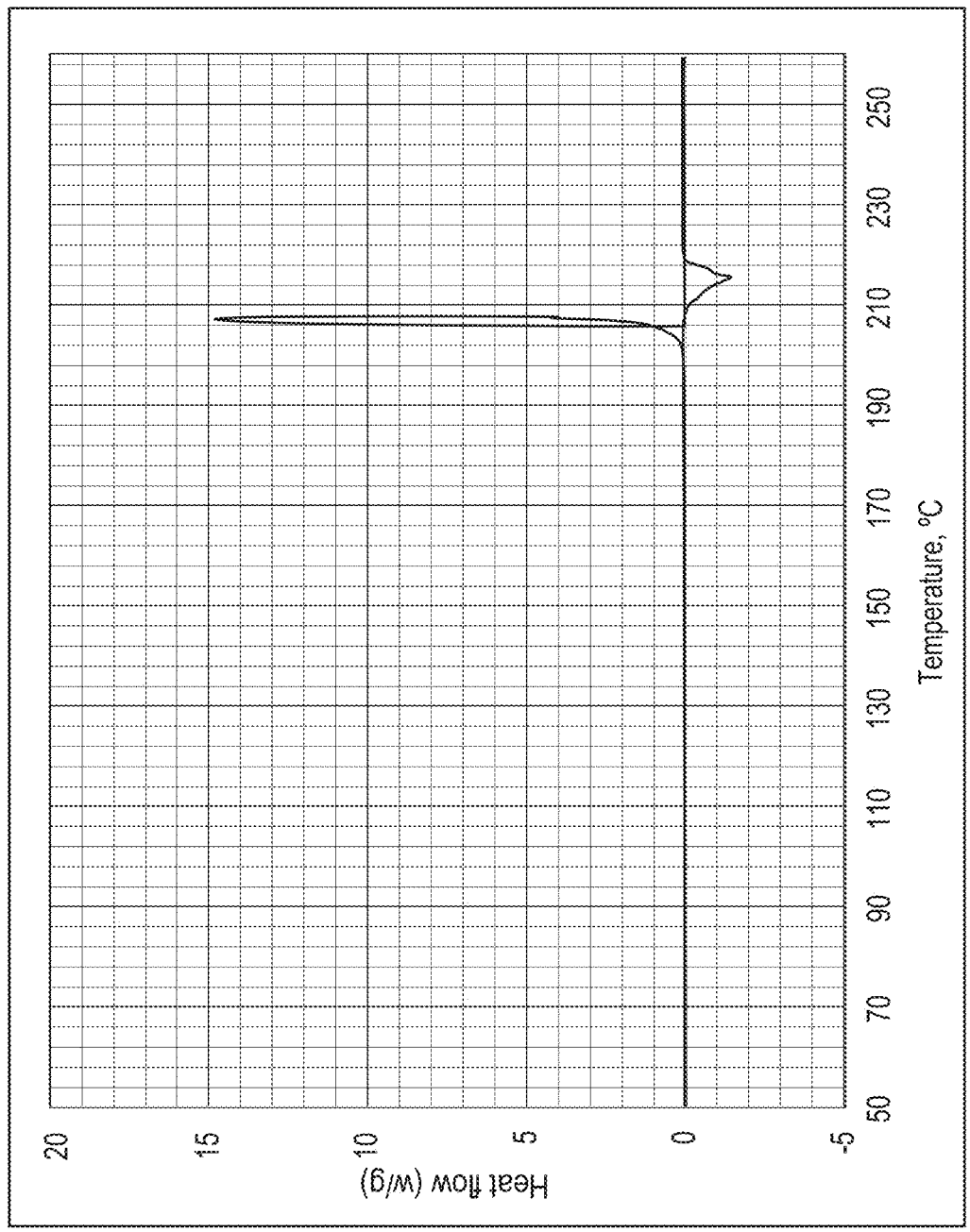
FIG. 6 is a differential scanning calorimetry (DSC) chart for an alloy according to the present disclosure.

As shown in FIGS. 3 to 6, the melting characteristics of solder alloys were determined by differential scanning calorimetry ("DSC"). The undercooling (i.e., the temperature difference between the onset of heating temperature and the onset of cooling temperature) was measured for the solder alloys. Undercooling occurs because precipitation of crystals is not spontaneous, but requires activation energy. FIG. 3 shows the DSC curve for a prior art SAC305 alloy comprising 96.5 wt. % tin, 3.0% silver, and 0.5 wt. % copper. FIGS. 4, 5, and 6, show the DSC curves for alloys according to the compositions of Examples 2.2, 2.3, and 2.5 shown in Table 2, respectively. In addition, data from the DSC analysis are shown in Table 3.

TABLE 3

| Alloy | Alloy Composition | Onset of Heating, $T_1$ ° C. | Onset of Cooling, $T_2$ ° C. | Undercooling ($\Delta T = T_1 - T_2$) | Pasty Range, ° C. |
|---|---|---|---|---|---|
| Prior Art SAC305 Alloy | Sn—0.5Cu—3Ag | 217 | 197 | 20 | 4 |
| Example 2.2 | Sn—0.75Cu—2.5Ag—3Bi—0.05Sb | 213.38 | 188.98 | 24.4 | 4.06 |

TABLE 3-continued

| Alloy | Alloy Composition | Onset of Heating, $T_1$ ° C. | Onset of Cooling, $T_2$ ° C. | Undercooling ($\Delta T = T_1 - T_2$) | Pasty Range, ° C. |
|---|---|---|---|---|---|
| Example 2.3 | Sn—0.75Cu—2.5Ag—3Bi—0.03Co—0.05Sb | 211.92 | 205.63 | 6.28 | 6.14 |
| Example 2.5 | Sn—0.75Cu—2.5Ag—3Bi—0.03Co/0.05Ni—0.05Sb | 211.91 | 206.42 | 5.48 | 6.67 |

High undercooling behaviors of tin-silver-copper (Sn—Ag—Cu) solders indicate that molten tin solder is difficult to solidify. High undercooling is attributed to difficulty in nucleating a solid phase from the liquid phase. A large undercooling can influence microstructural features such tin dendrite, eutectic microstructure, primary intermetallic compounds ($Ag_3Sn$, $Cu_6Sn_5$) which in turn affects the mechanical properties of the solder. Such undercooling can have serious impact on the reliability of solder joints and cause an unfavorable situation where joints solidified at different times. This could lead to stress concentration into solidified joint and cause mechanical failure.

As can be seen by comparing FIG. 3 with FIGS. 4 to 6, and by reviewing Table 3, several of the example alloys exhibit a noticeable reduction in undercooling as compared to the prior art SAC305 alloy. For example, for the prior art SAC305 alloy, the onset of heating ($T_1$) is at 217° C. and the onset of cooling ($T_2$) is at 197° C., providing an undercooling ($\Delta T$) of 20° C. For the Example 2.3 alloy, $T_1$ is at approximately 212° C. and $T_2$ is at approximately 205.6° C., providing an undercooling ($\Delta T$) of over 6° C. The undercooling of the Example 2.5 alloy is even lower at approximately 5.5° C.

Figure 7A:
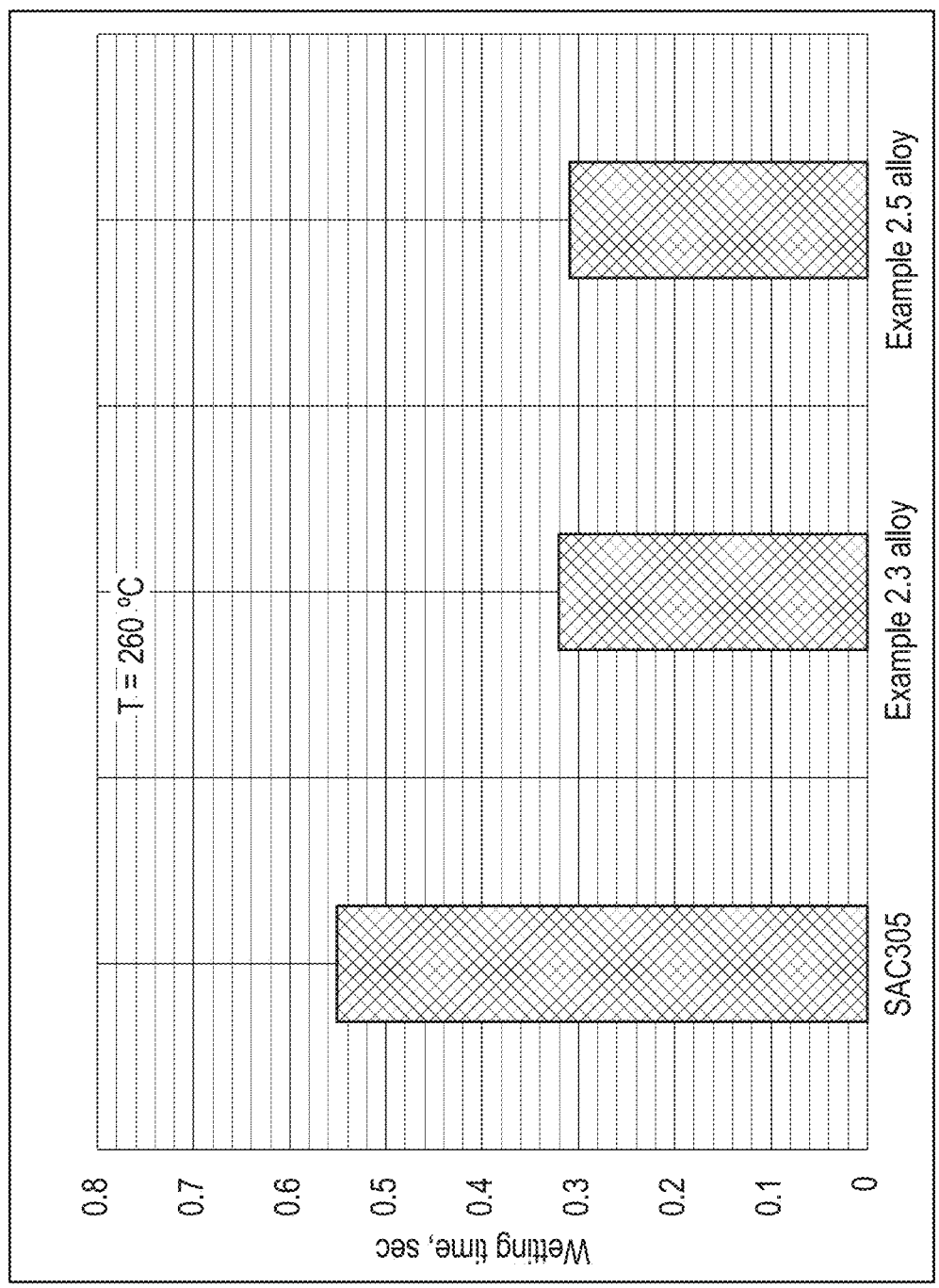
FIG. 7A is a bar chart showing a comparison between the wetting time of two alloys according to the present disclosure and a prior art SAC305 alloy.
Figure 7B:
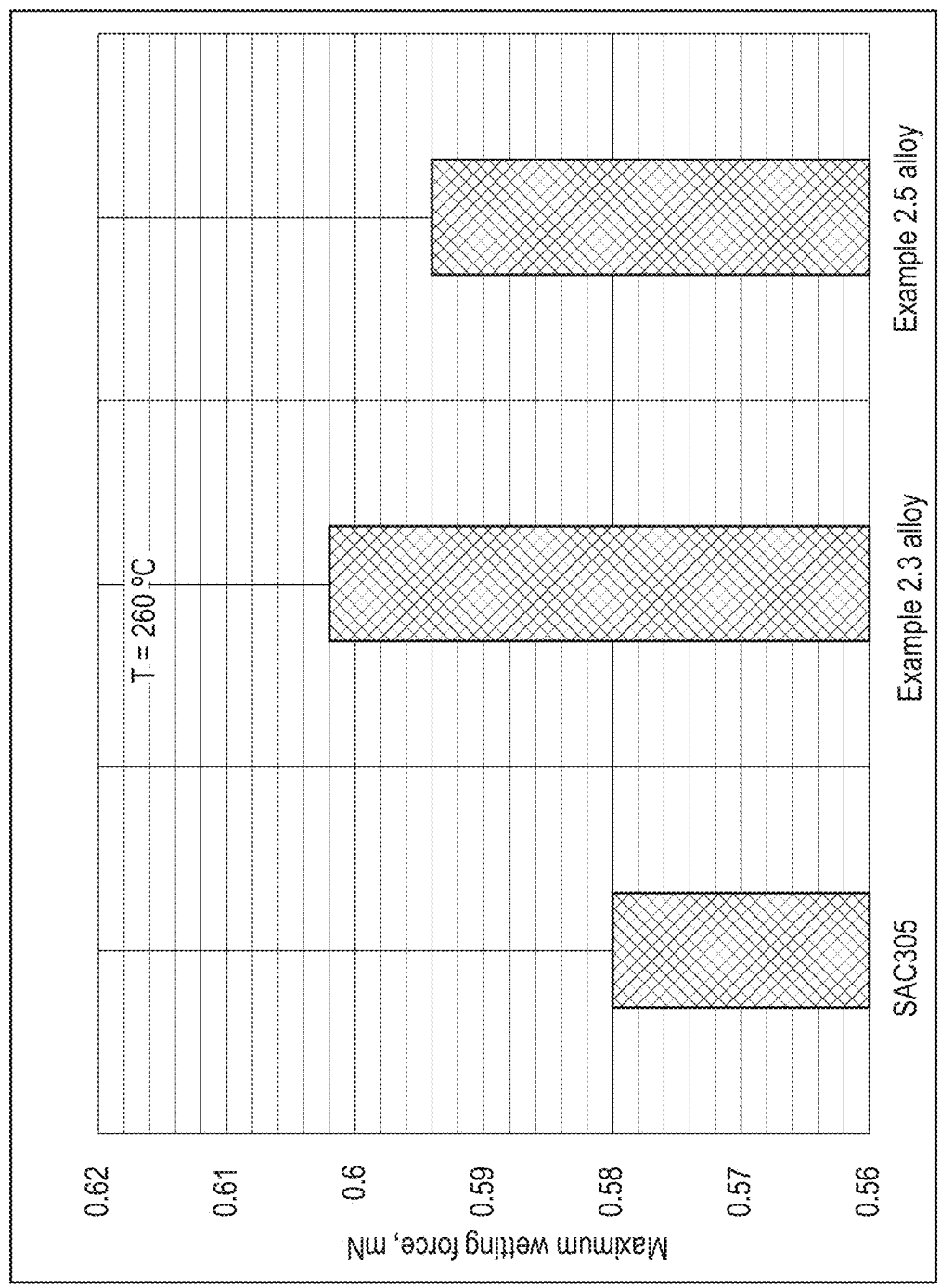
FIG. 7B is a bar chart showing a comparison between the maximum wetting force of two alloys according to the present disclosure and a prior art SAC305 alloy.

FIGS. 7A and 7B show a comparison between the wetting time (FIG. 7A) and the maximum wetting force (FIG. 7B) of a prior art SAC305 alloy, the Example 2.3 alloy, and the Example 2.5 alloy. The wetting experiments were performed according to IPC (Association Connecting Electronics Industries) standard IPC-TM-650. This standard involves a wetting balance test that involves determining the total wetting time and maximum wetting force. A shorter wetting time corresponds to a higher wettability. A shorter wetting time and a higher wetting force reflects better wetting performance and correlates with spread and fillet formation under a given soldering process. FIGS. 7A and 7B demonstrate that the wetting properties of the Example 2.3 and 2.5 alloys are better than (or at a minimum comparable to) the prior art SAC305 alloy.

Wetting performance of solder can also be expressed in terms of spread ratio and spreadability. The spread area indicates how much solder is on the soldering pad substrate, and can be indicated as a spread ratio. A spread test was performed in accordance with the IPC (IPC J-STD-004B, TM 2.4.46) and JIS Z 3197 standards. Spread ratio and spreadability were investigated for three different substrates: bare copper (Cu), Organic Solderability Preservative (OSP) coated copper, and Electroless Nickel Immersion Gold (ENIG) plated copper. The solder alloys (circular preform) were melted onto the substrate being tested using flux. The wetted area was measured using an optical microscope before and after the test. The spread ratio is calculated by wetted area after reflow/melt divided by wetted area before reflow/melt. The solder height was measured to calculate the spreadability (or spread factor). Spreadability was calculated using the following formula, where $S_R$=spreadability, D=diameter of solder (assumed to be spherical), H=height of spread solder, and V=volume of solder (g/cm$^3$) (estimated from mass and density of tested solder):

$$S_R = \frac{D - H}{D} \times 100 \text{ where } D = 1.248 \times V^{1/3}$$

Figure 8A:
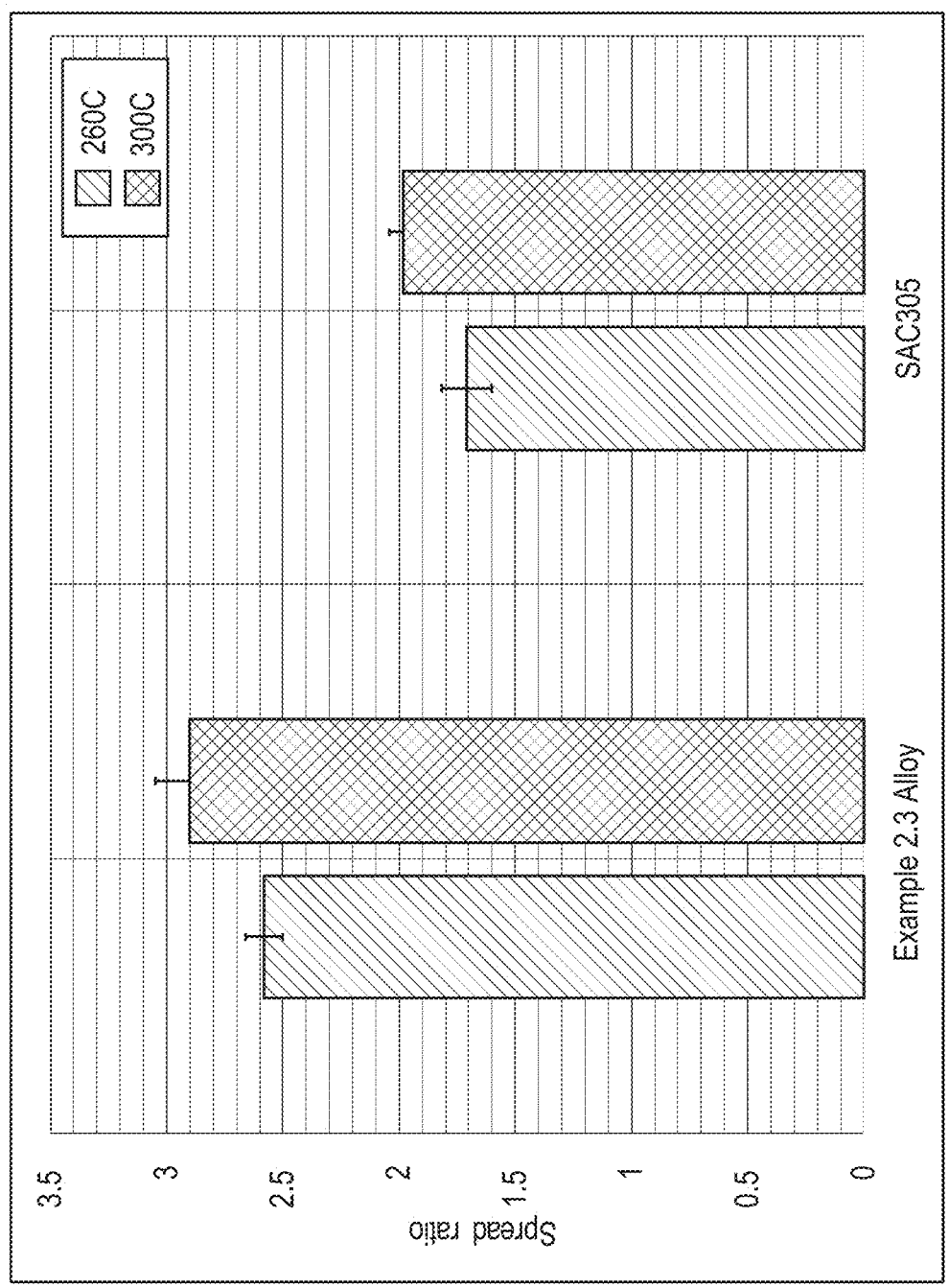
FIG. 8A is a bar chart showing a comparison between the spread ratio of an alloy according to the present disclosure and a prior art SAC305 alloy.
Figure 8B:
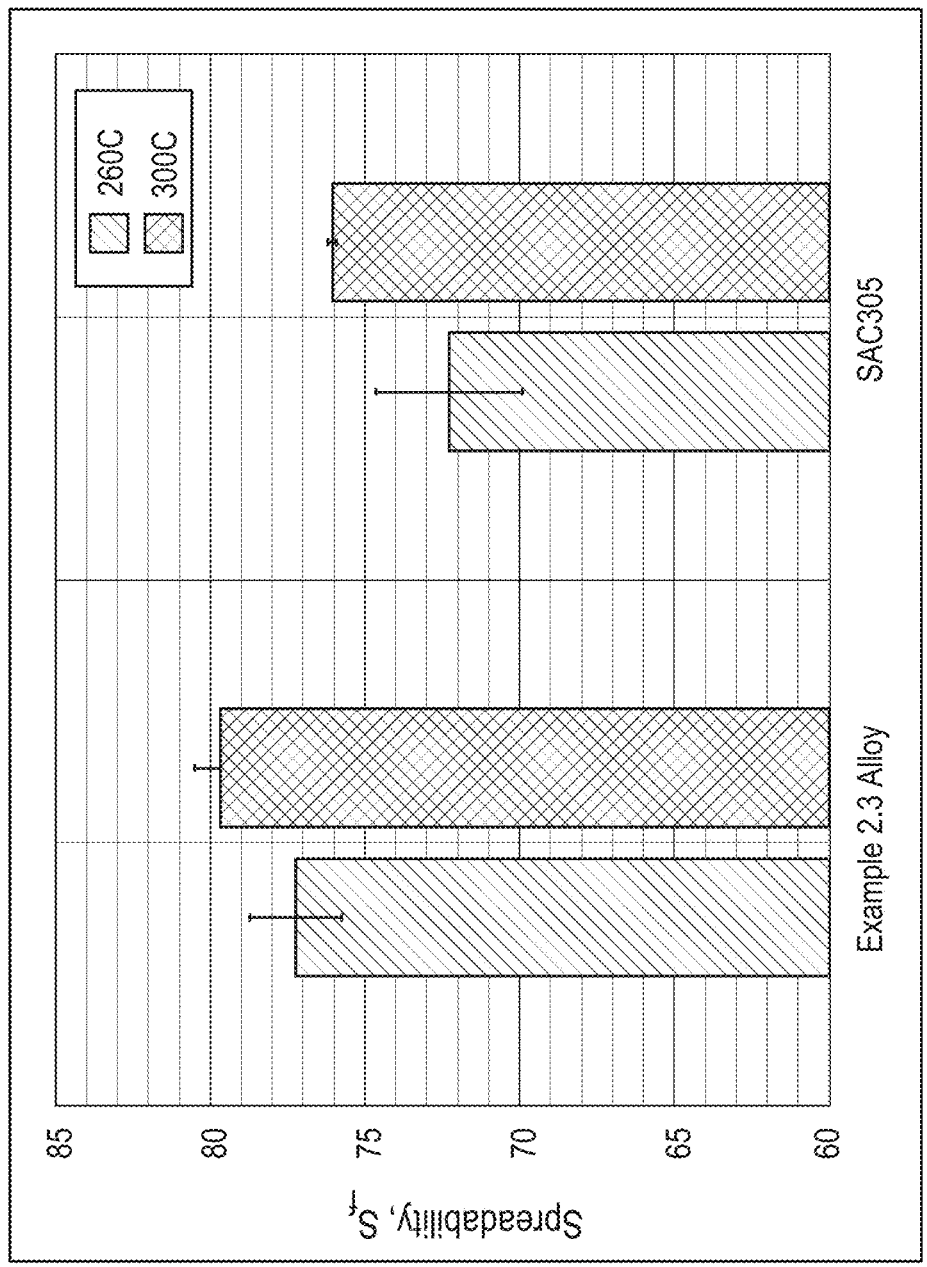
FIG. 8B is a bar chart showing a comparison between the spreadability of an alloy according to the present disclosure and a prior art SAC305 alloy.

FIG. 8A shows a comparison between the spread ratio of the Example 2.3 alloy as compared to a prior art SAC alloy on a bare copper substrate at two different temperatures (260° C. and 300° C.). FIG. 8B shows a comparison between the spreadability of the Example 2.3 alloy as compared to a prior art SAC alloy at two different temperatures (260° C. and 300° C.).

Figure 9A:
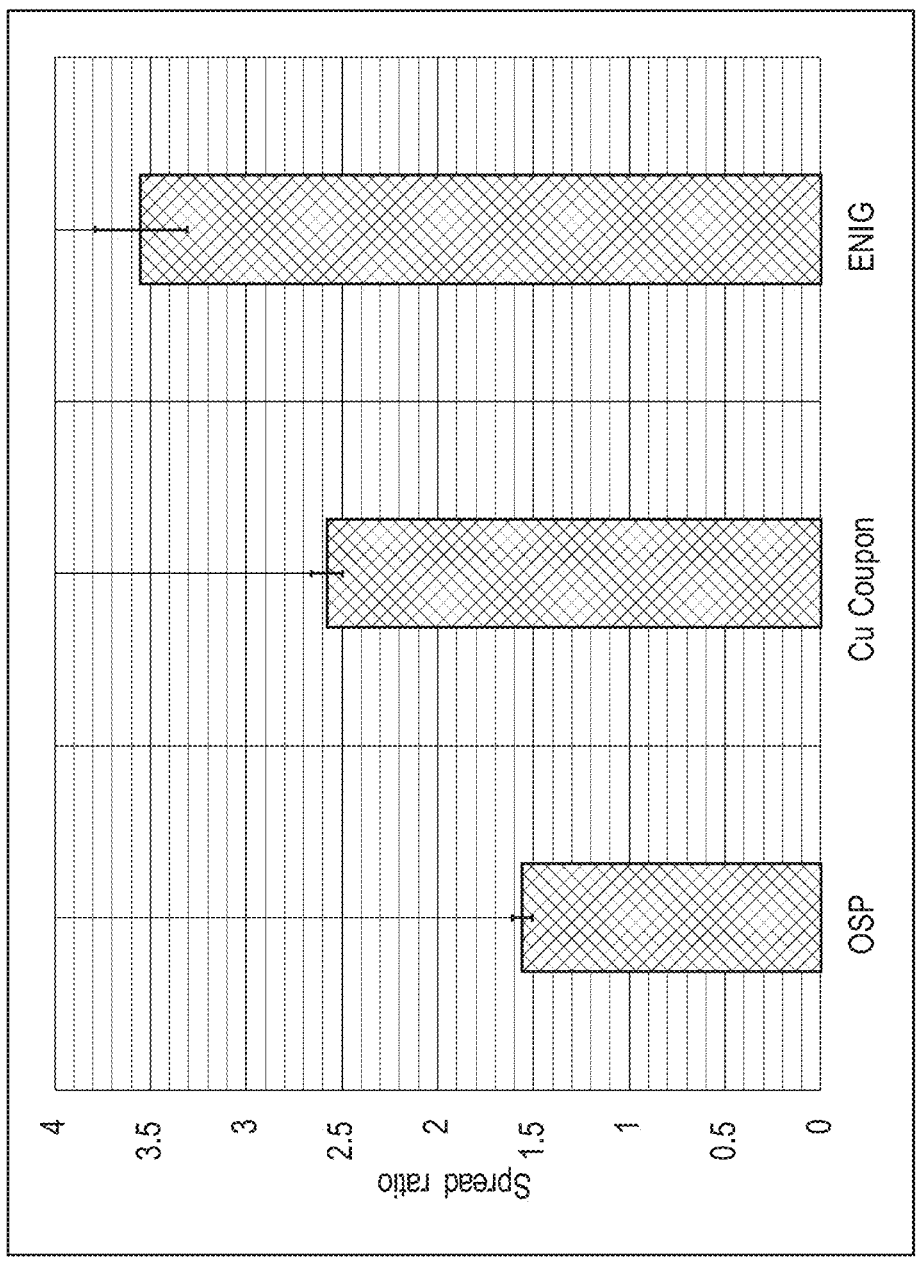
FIG. 9A is a bar chart showing the spread ratio of an alloy according to the present disclosure on three different substrates.
Figure 9B:
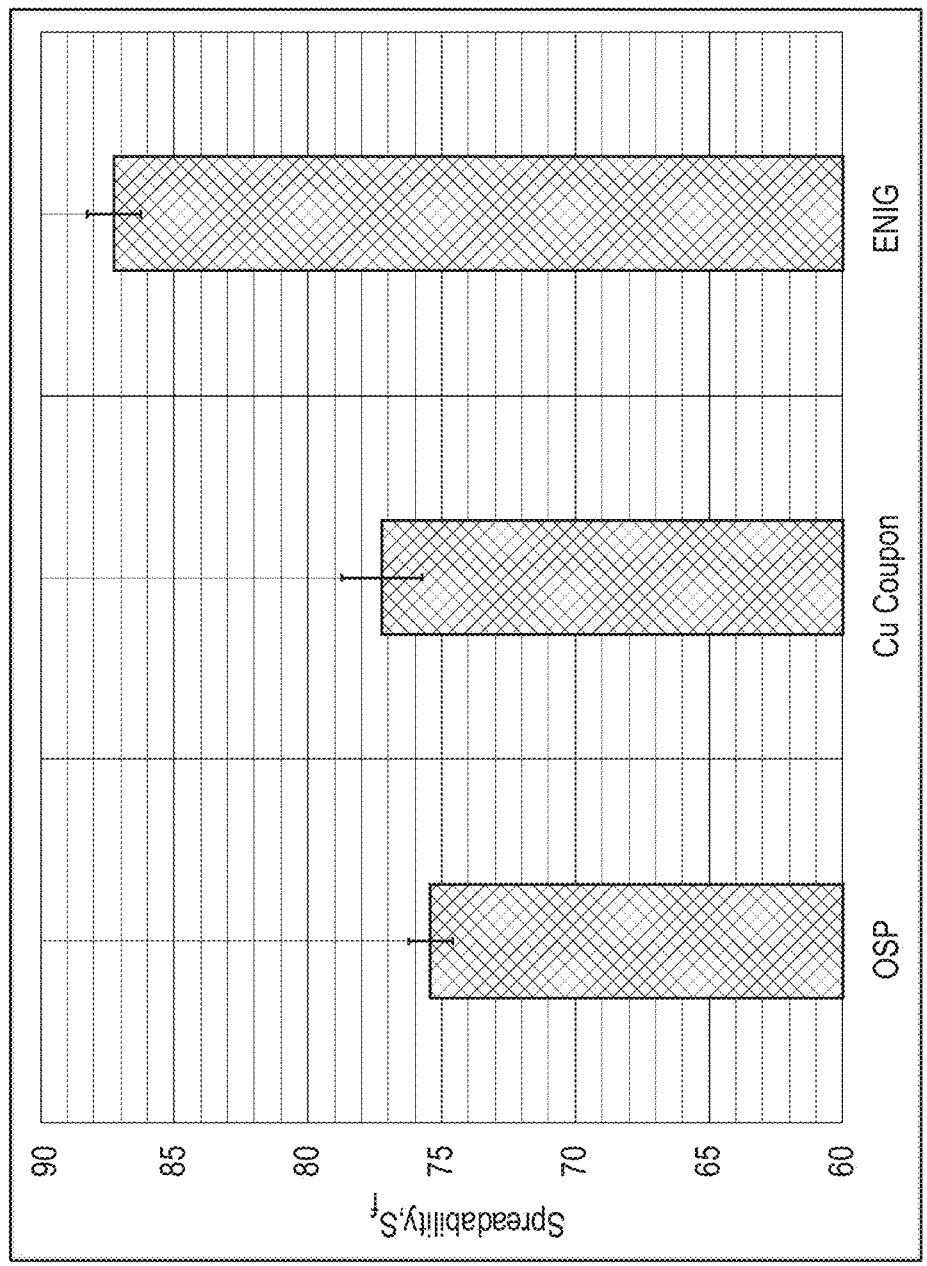
FIG. 9B is a bar chart showing the spreadability of an alloy according to the present disclosure on three different substrates.

FIG. 9A shows a comparison between the spread ratio of the Example 2.3 alloy on three different copper substrates (OSP, bare copper, and ENIG) at 255° C. FIG. 9B shows a comparison between the spreadability of the Example 2.3 alloy on three different copper substrates (OSP, bare copper, and ENIG) at 255° C.

Figure 10A:
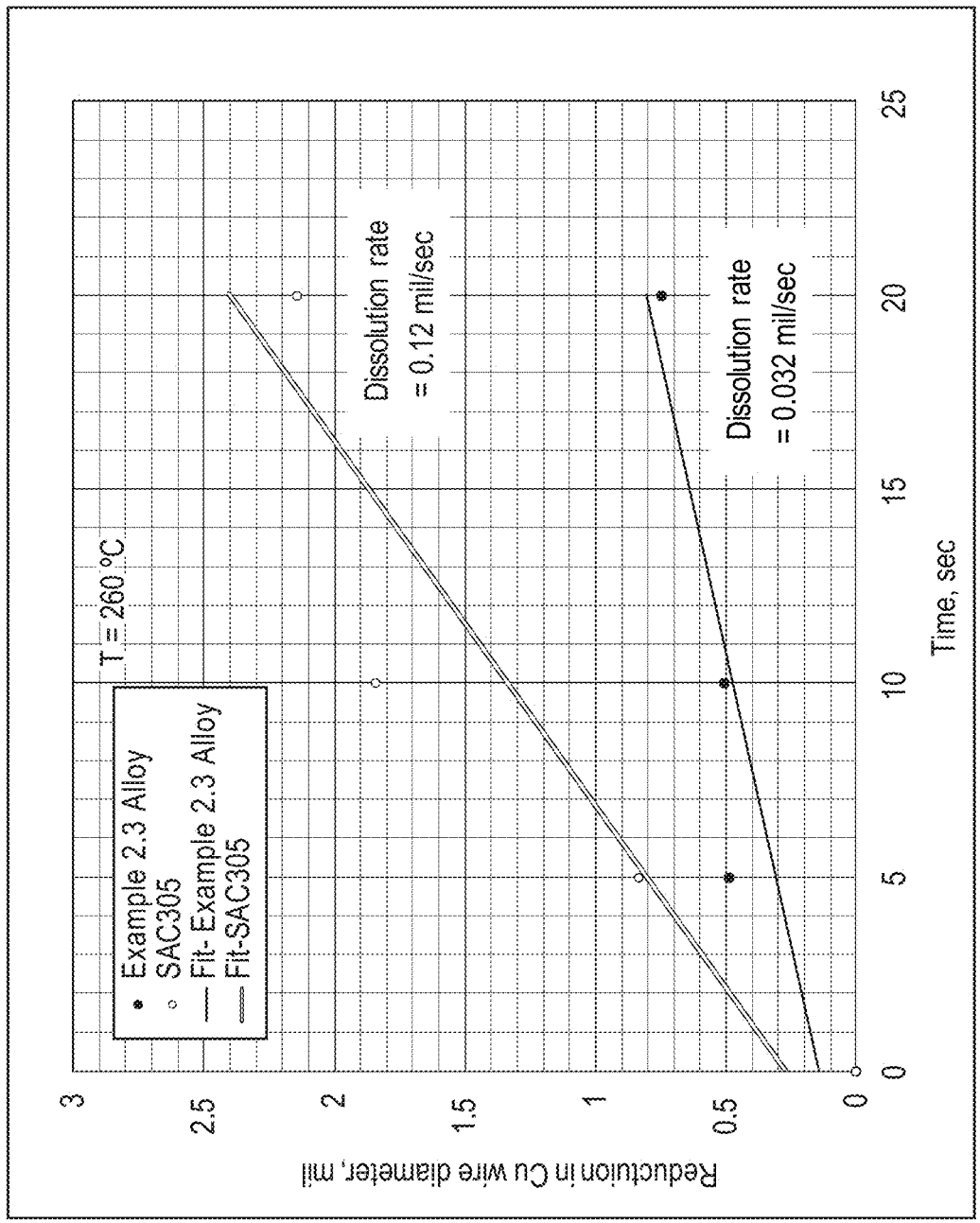
FIG. 10A is a line chart showing a comparison between the copper wire dissolution rate of an alloy according to the present disclosure and a prior art SAC305 alloy at 260° C.
Figure 10B:
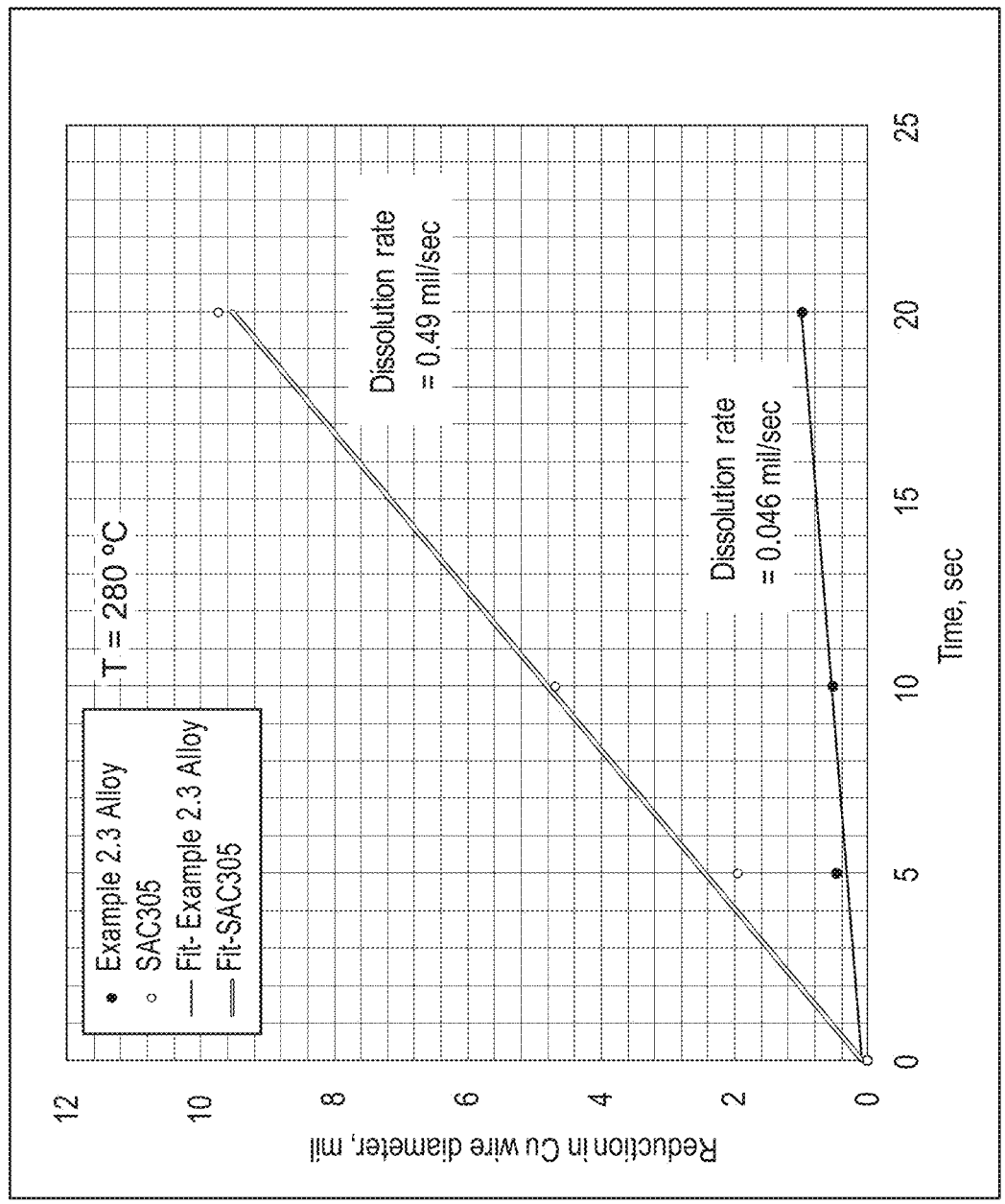
FIG. 10B is a line chart showing a comparison between the copper wire dissolution rate of an alloy according to the present disclosure and a prior art SAC305 alloy at 280° C.
Figure 11B:
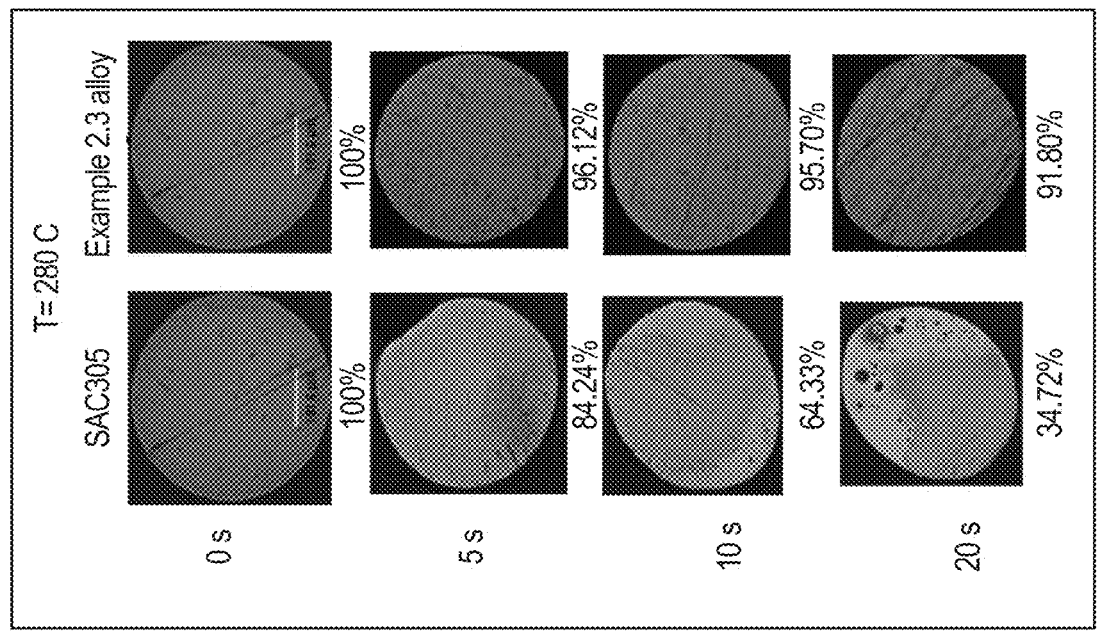
FIG. 11B shows a comparative series of optical micrographs comparing the copper wire dissolution rate of an alloy according to the present disclosure and a prior art SAC305 alloy at 280° C.
Figure 11A:
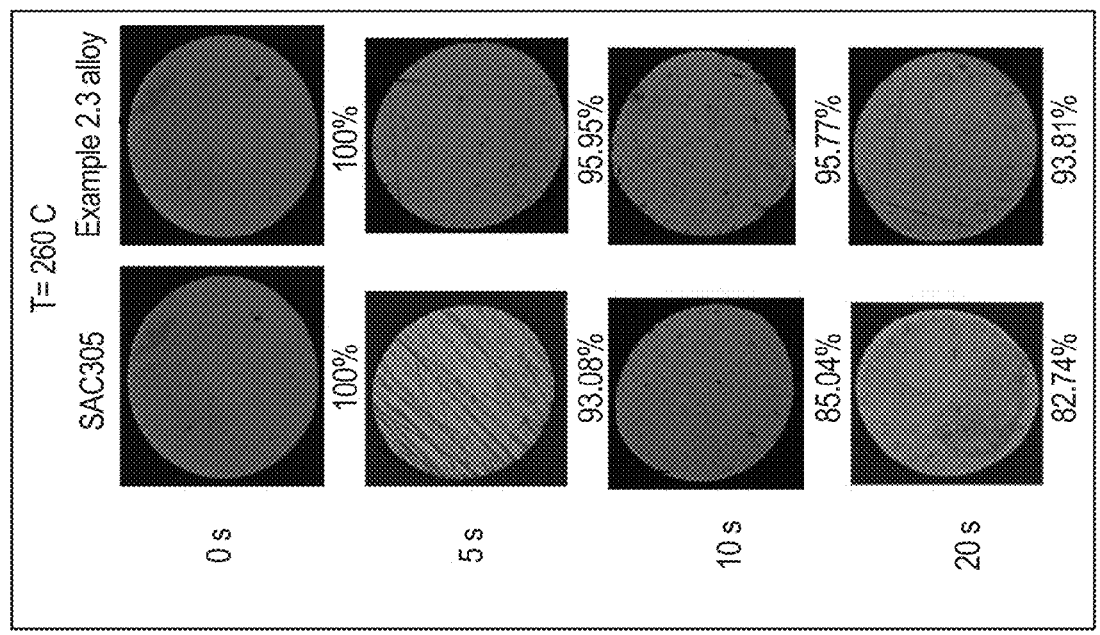
FIG. 11A shows a comparative series of optical micrographs comparing the copper wire dissolution rate of an alloy according to the present disclosure and a prior art SAC305 alloy at 260° C.

FIGS. 10A, 10B, 11A, and 11B show a comparison between the copper dissolution rate of a prior art SAC305 alloy and the Example 2.3 alloy (Alloy-B) at 260° C. (FIGS. 10A and 11A) and at 280° C. (FIGS. 10B and 11B). As can be seen in these figures, the copper dissolution rate is slower for the Example 2.3 alloy as compared to the prior art SAC305 alloy. The copper dissolution tests were performed using pure copper wire that was washed, degreased, cleaned in acid solution, rinsed, and dried. The tests were conduct at two temperatures: 260° C. and 280° C. The copper wires were exposed to molten solder for 5 seconds, 10 seconds, and 20 seconds. Cross sections of the copper wires were analyzed by optical microscopy, including to perform area measurement and analysis.

Figure 12A:
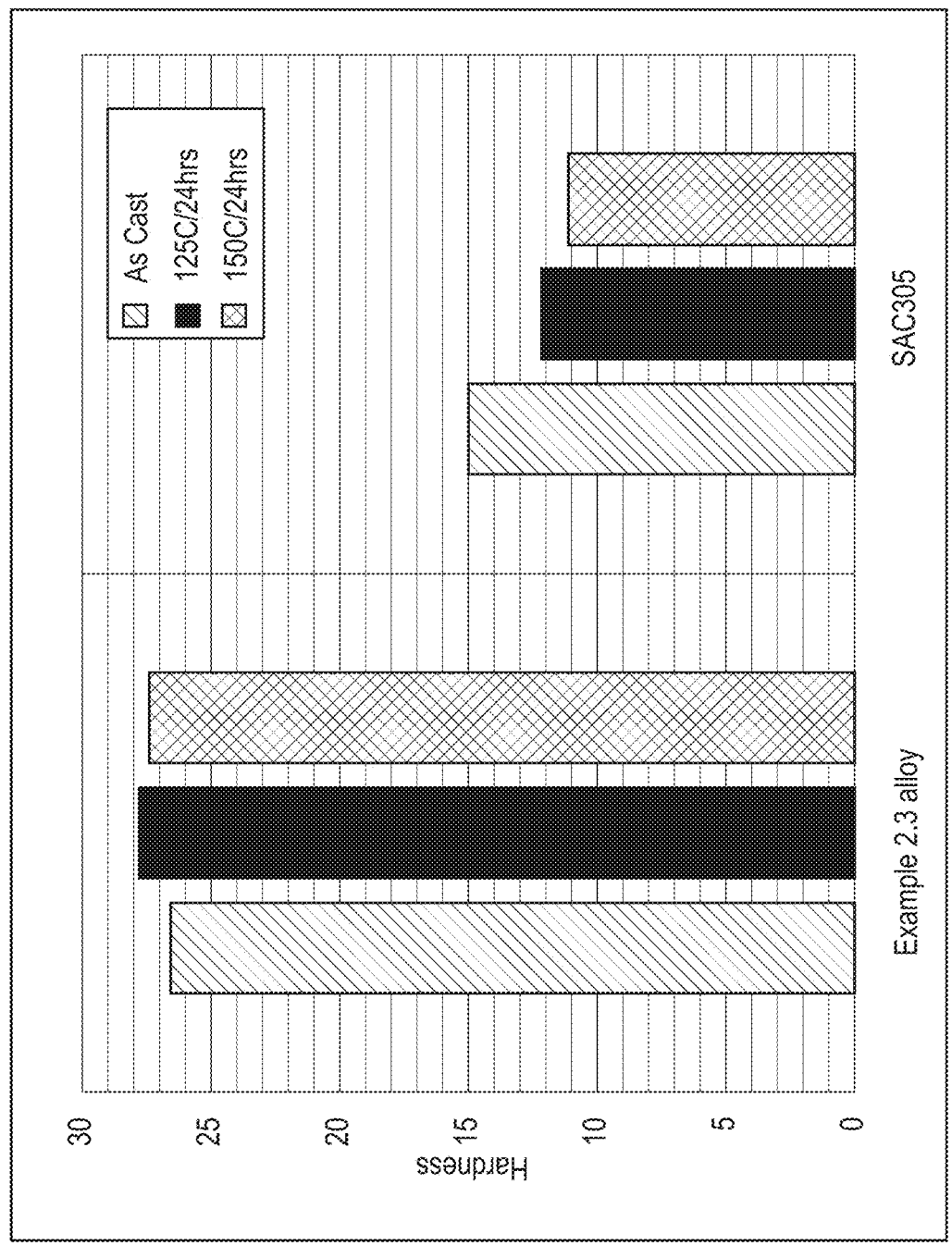
FIG. 12A is a bar chart showing a comparison between the hardness of an alloy according to the present disclosure and a prior art SAC305 alloy.
Figure 12B:
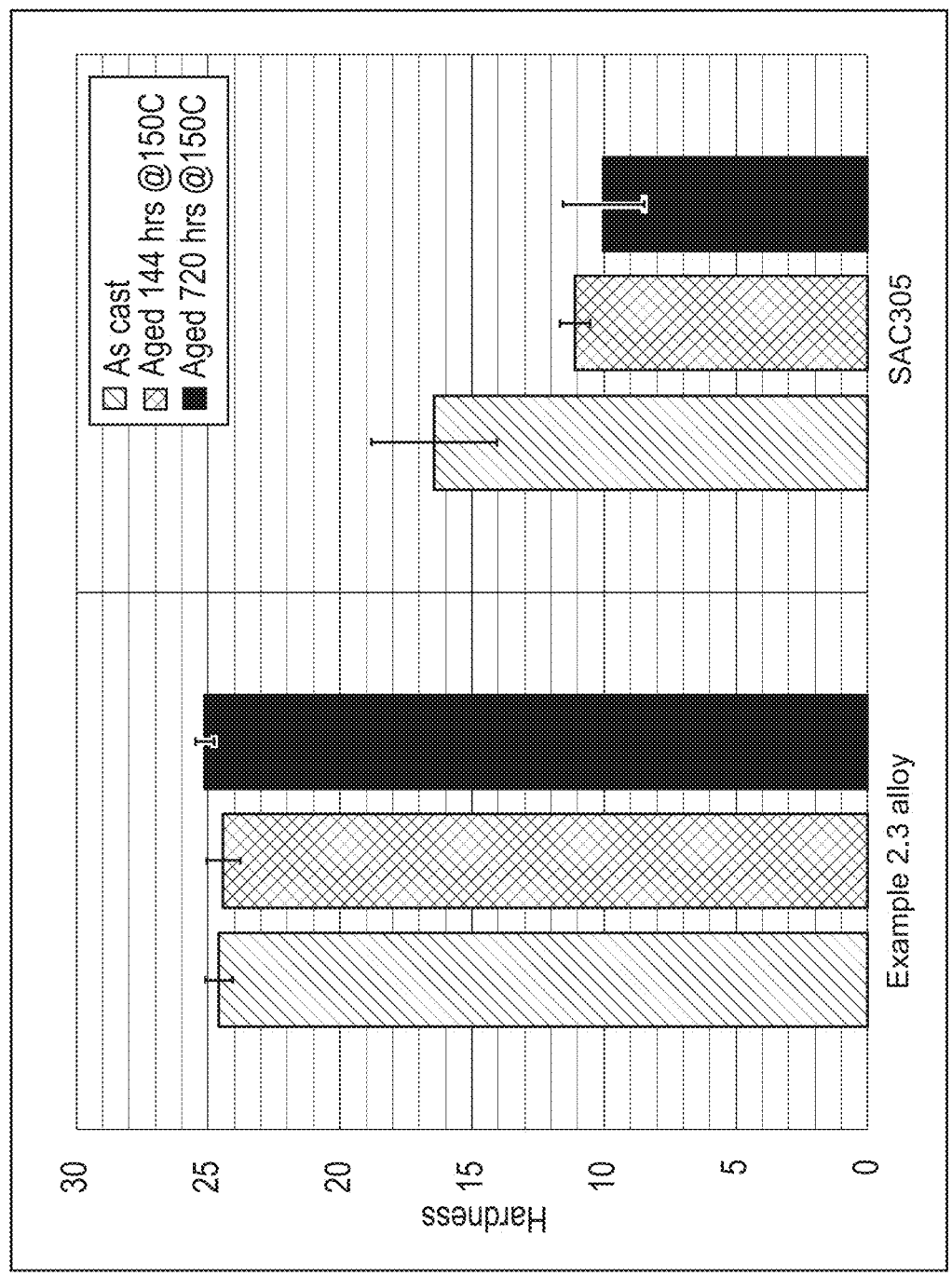
FIG. 12B is a bar chart showing a comparison between the hardness of an alloy according to the present disclosure and a prior art SAC305 alloy, where both alloys have been isothermally aged at 150° C.

FIG. 12A shows the hardness values of the Example 2.3 alloy as compared to a prior art SAC305 alloy. As can be seen from the bar chart, the hardness of the Example 2.3 alloy is higher than the hardness of the prior art SAC305 alloy. Further, the Example 2.3 alloy retains its hardness after aging, in contrast to the prior art SAC305 alloy, as shown in FIG. 12B, which shows the result of hardness testing as cast, after aging 144 hours at 150° C., and after aging 720 hours at 150° C.

The coefficient of thermal expansion (CTE) of the alloys according to the current disclosure was also measured. Mismatches between the CTE of a solder and an underlying substrate can lead to fatigue failure during cyclic loading. As the CTE mismatch increases, so too does the shear strain, which decreases the thermal cycle life of a component. Cracks may start and propagate at sites of stress concentration due to a CTE mismatch. Cracking in solder joints may be reduced by reducing the difference between the CTE of a solder and an underlying substrate. Table 4 shows the CTE of an alloy according to the present disclosure compared to a prior art SAC305 alloy and with reference to the CTE of an example underlying substrate.

TABLE 4

| Alloy | Alloy/Substrate Composition | Temperature Range, °C. | CTE, ppm/°C. |
|---|---|---|---|
| SAC305 | Sn—3.0Ag—0.5Cu | 30-150 | 24.0 |
| Example 2.3 | Sn—0.75Cu—2.5Ag—3Bi—0.03Co—0.05Sb | 30-150 | 22.0 |
| Example Substrate | Copper | 30-150 | 16.7 |

Figure 13:
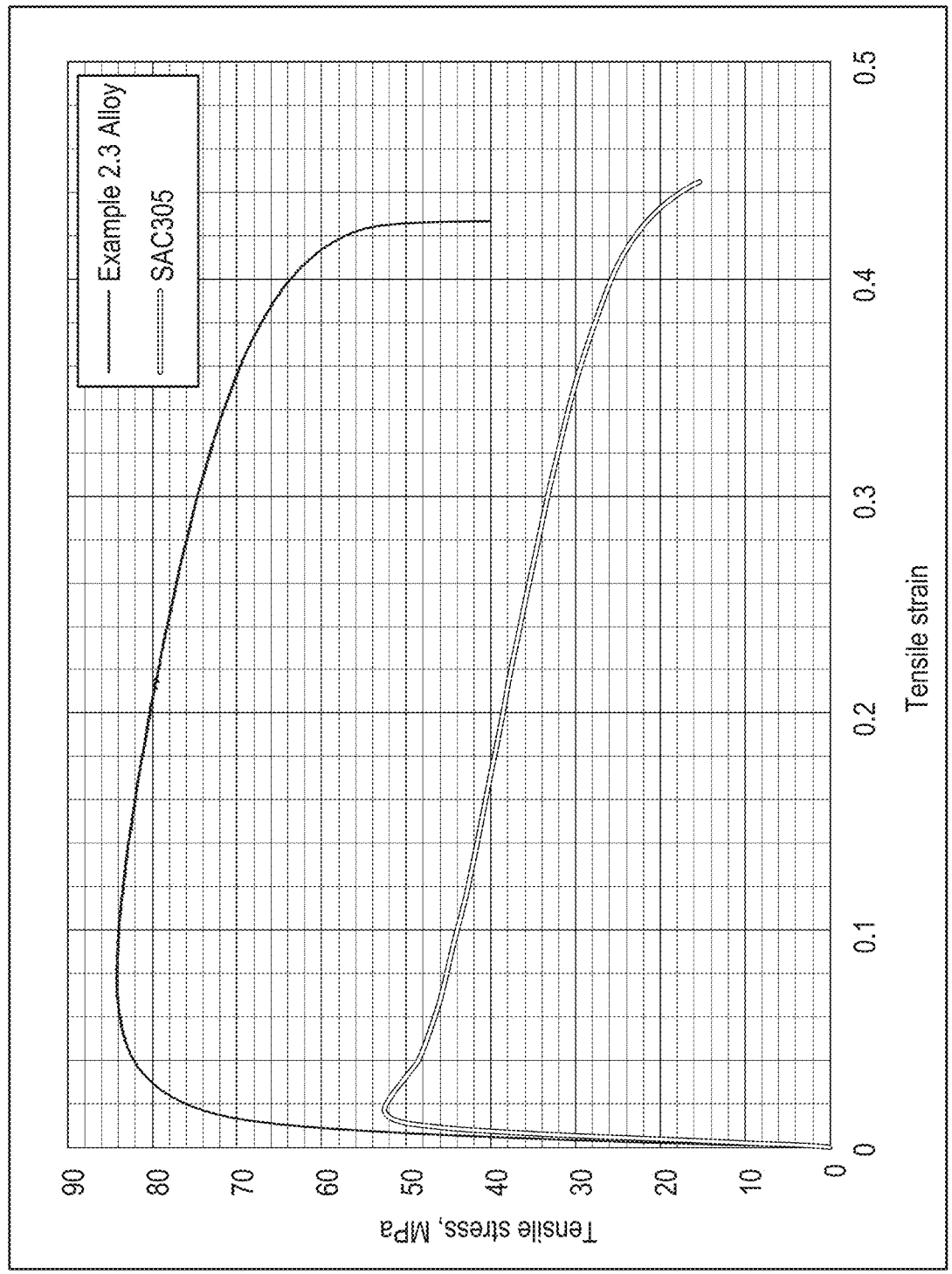
FIG. 13 is a line chart showing stress-strain curves for an alloy according to the present disclosure and a prior art SAC305 alloy.
Figure 14:
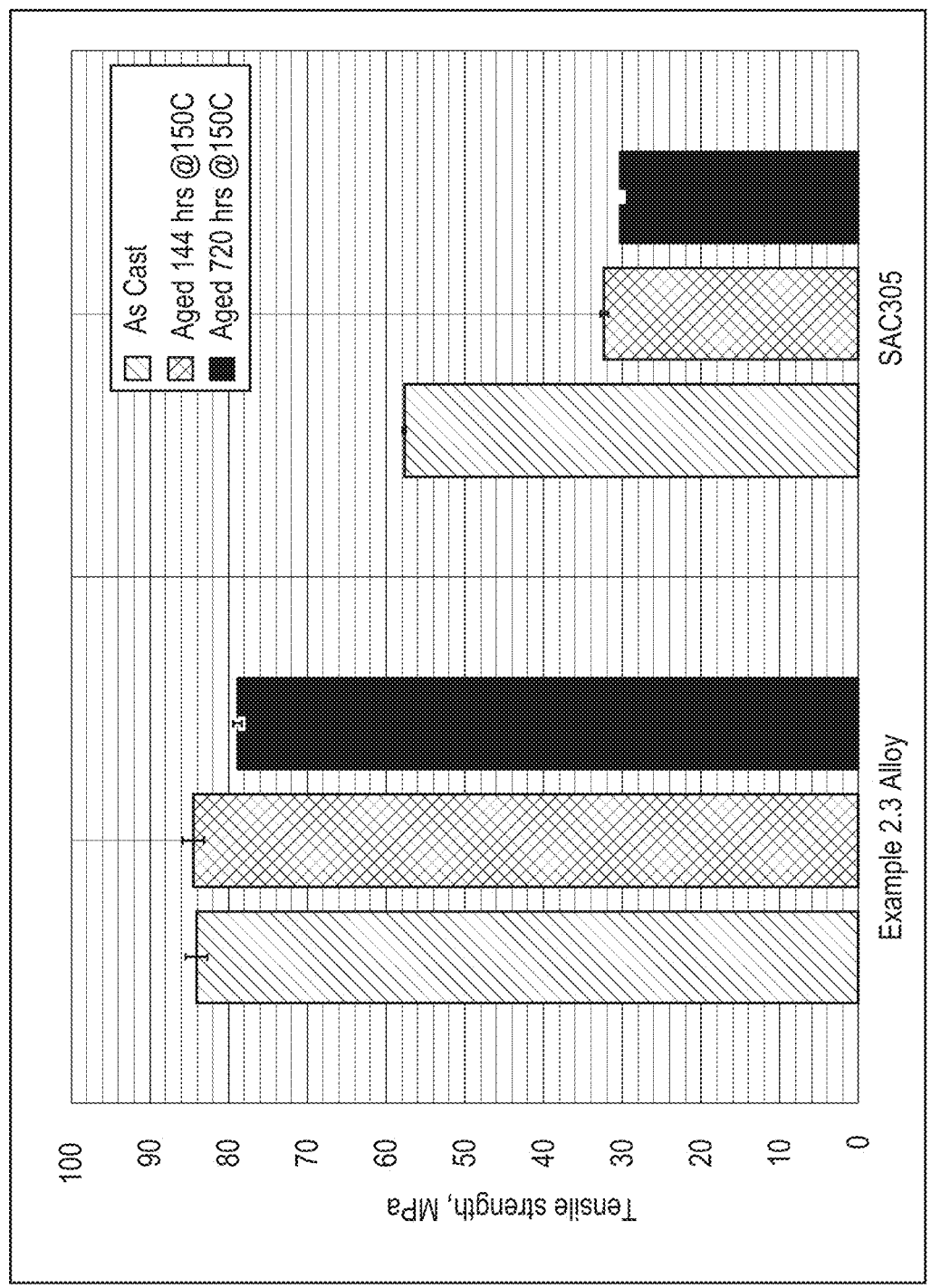
FIG. 14 is a bar chart showing a comparison of the ultimate tensile strength of an alloy according to the present disclosure and a prior art SAC305 alloy.

A tensile stress-strain chart of an example alloy according to the present disclosure (Example 2.3 alloy) as compared to a prior art SAC305 alloy is shown in FIG. 13. Casting solders were machined and cut into rectangular pieces of size 100 mm×6 mm×3 mm. Samples were isothermally aged at 150° C. for up to 720 hours. Tensile tests were conducted at room temperature at a strain rate of $10^{-2}$ $s^{-1}$. The ultimate tensile strength and yield strength of the alloys are shown in Table 5. The significant improvement of tensile strength shown in the Example 2.3 alloy may be due to the addition of bismuth and solid solution strengthening effect. The Example 2.3 alloy is also shown to be more ductile than the prior art SAC305 alloy. The tensile strength properties of the Example 2.3 alloy and prior art SAC305 alloy after aging at 150° C. are shown in FIG. 14. Both the Example 2.3 alloy and the prior art SAC305 alloy show a reduction in ultimate tensile strength after aging at an elevated temperature, but the reduction is considerably more marked for the prior art SAC305 alloy, which exhibited about a 42% reduction in tensile strength.

TABLE 5

| Alloy | Alloy Composition | Ultimate Tensile Strength, MPa | Yield Strength, MPa |
|---|---|---|---|
| SAC305 | Sn—3.0Ag—0.5Cu | 57.72 ± 0.24 | 49.72 ± 0.19 |
| Example 2.3 | Sn—0.75Cu—2.5Ag—3Bi—0.03Co—0.05Sb | 87.15 ± 0.87 | 82.8 ± 0.97 |

Figure 15:
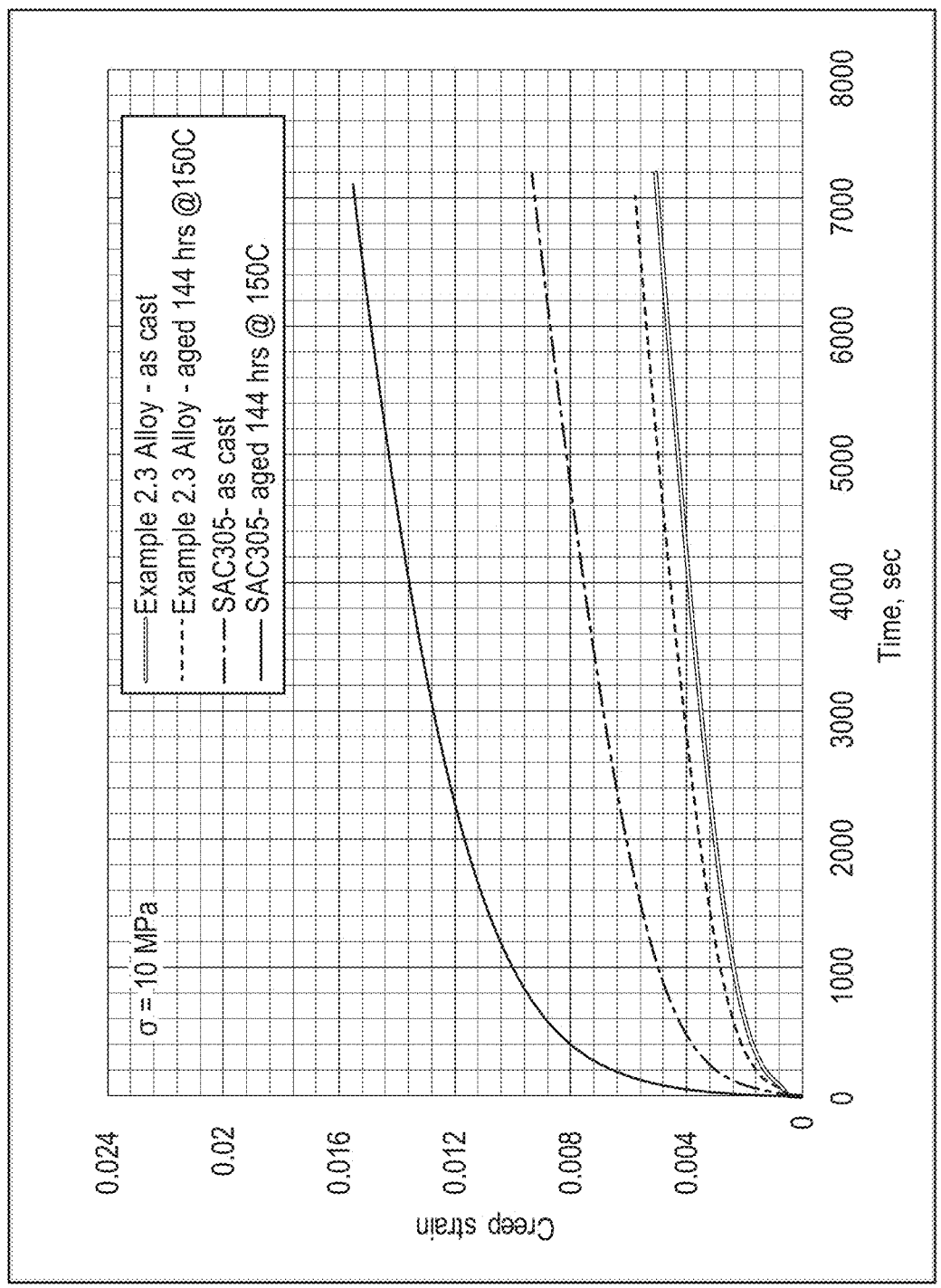
FIG. 15 is a line chart showing creep strain as a function of time for an alloy according to the present disclosure and a prior art SAC305 alloy both as cast and after aging for 144 hours at 150° C.

Creep deformation is a major failure mode of solder joints in microelectronic packaging because of the high homologous temperatures involved. Solder experiences thermo-mechanical stresses due to different coefficient of thermal expansion (CTE) between the chip and other layers within the packages. These stresses can cause plastic deformation over a long period of service. Solder alloys may undergo creep deformation even at room temperature. In real life applications, electronic modules can operate over a temperature range of −40° C. to +125° C., which is in the range of 0.48 to 0.87 $T_m$ (fraction of the melting temperature of the solder). For devices under stress, this is a rapid creep deformation range. Thus, a thorough understanding of creep deformation in lead-free solder is an important concern for the electronic packaging industry. Casting solders were machined and cut into rectangular pieces of size 120 mm×6 mm×3 mm. Samples were isothermally aged at 150° C. for up to 144 hours. Creep tests were conducted at room temperature at a stress level of 10 MPa. As shown in FIG. 15, an Example 2.3 alloy according to the present disclosure shows superior creep resistance as compared to a prior art SAC305 alloy. The creep resistance exhibited by the Example 2.3 alloy may be due to the addition of microalloys to refine the microstructure and strengthening mechanisms such as solid solution and precipitation hardening.

During a soldering operation, materials from the solid substrate dissolve and mix with the solder, allowing intermetallic compounds (IMCs) to form. A thin, continuous, and uniform IMC layer tends to be important for good bonding. Without IMCs, the solder/conductor joint tends to be weak because no metallurgical interaction occurs in the bonding. However, a thick IMC layer at the interface may degrade the reliability of the solder joints because a thick IMC layer may be brittle. IMC layers formed between solder and OSP substrate as a function of exposure time and temperature were examined. Solder alloys were melted on an OSP substrate and reflowed in an Electrovert OmniExcel 7 Zone Reflow oven using flux. Solder alloy samples were then exposed to an elevated temperature at 150° C. for up to 1440 hours. IMC layers were evaluated at different periods of aging time.

Figures 16A, 16B:
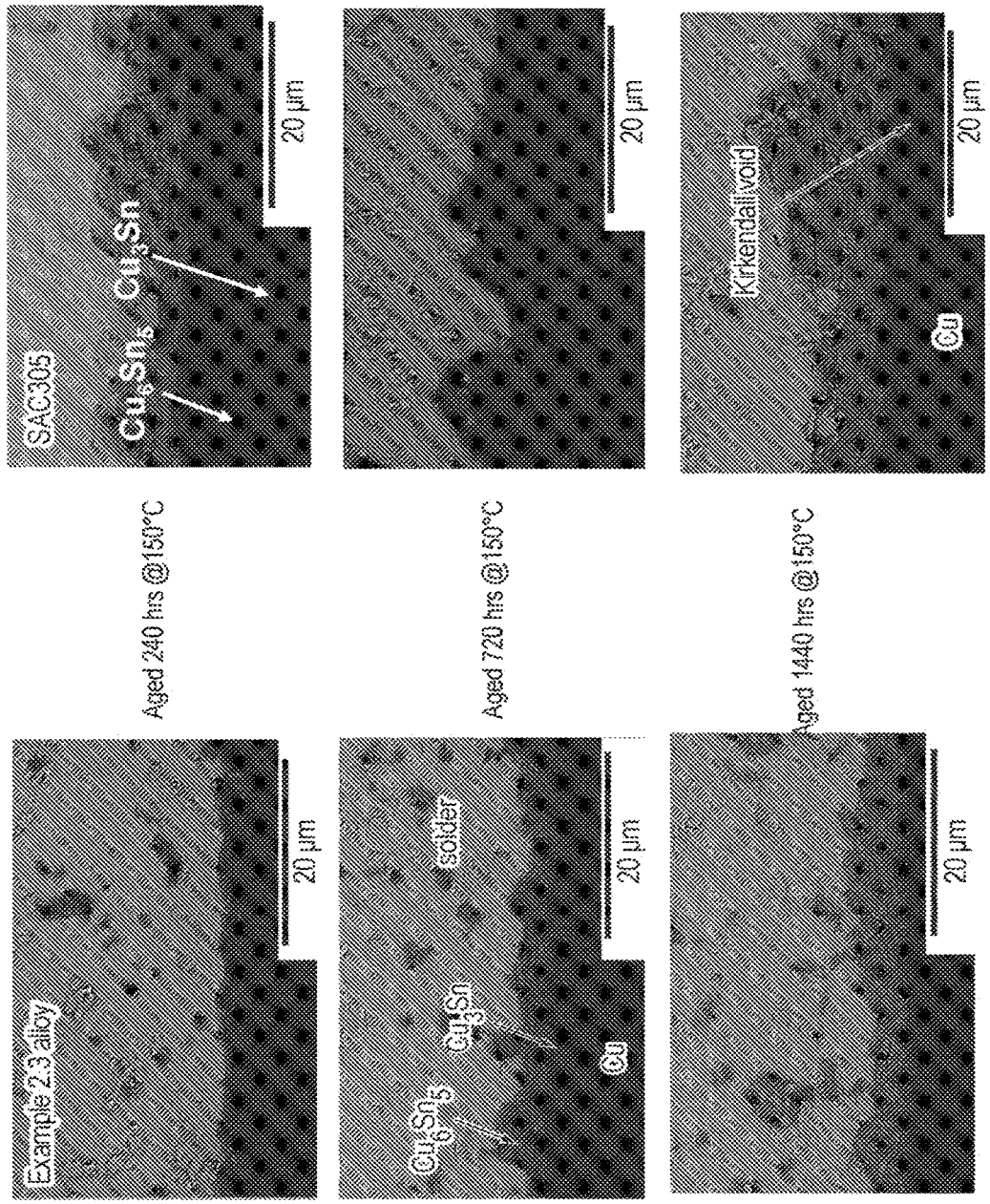
FIG. 16A shows a series of micrographs of the interface between an alloy according to the present disclosure and an underlying copper substrate after aging at 150° C. for 240, 720, and 1440 hours.
FIG. 16B shows a series of micrographs of the interface between a prior art SAC305 alloy and an underlying copper substrate after aging at 150° C. for 240, 720, and 1440 hours.
Figure 17:
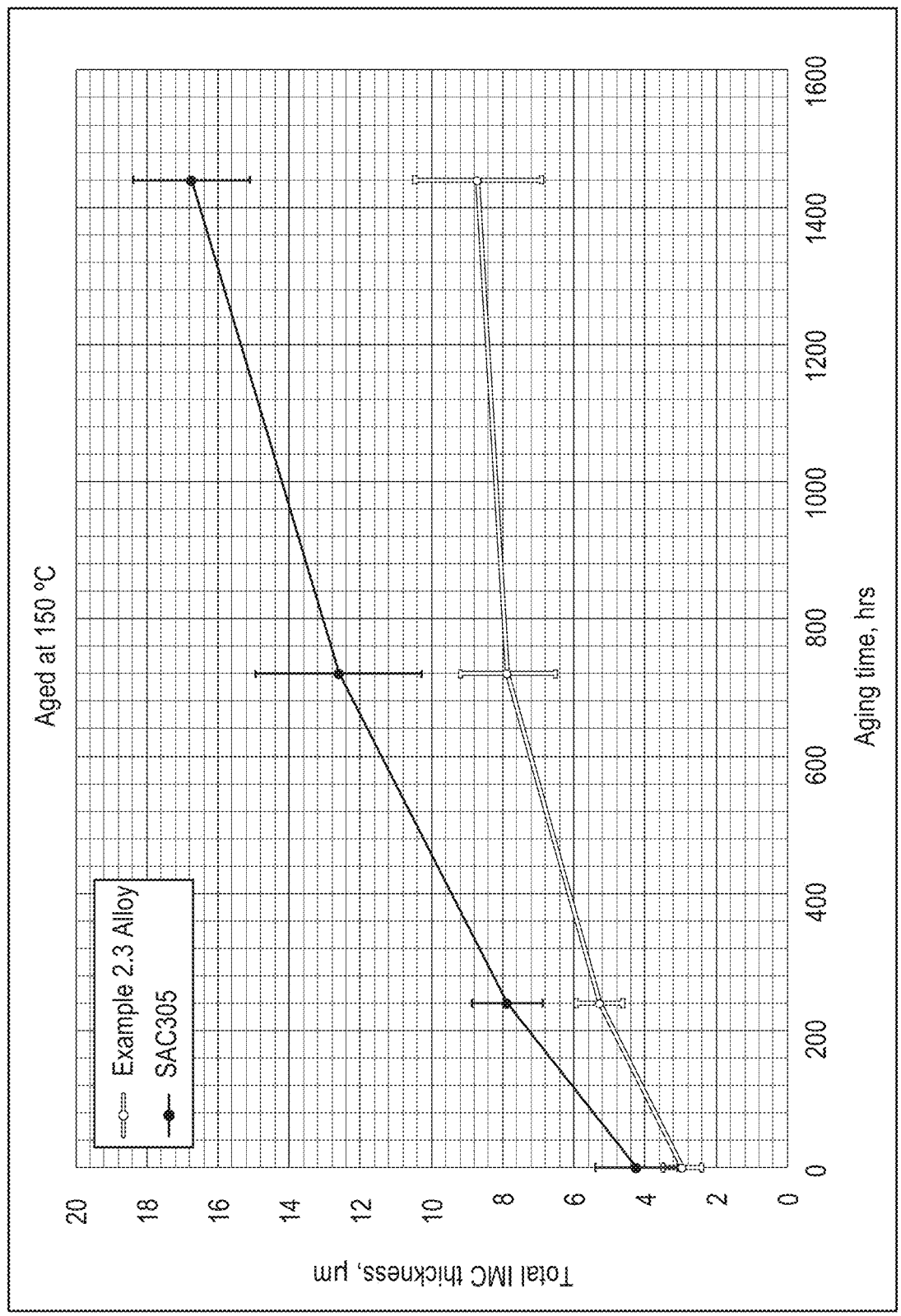
FIG. 17 is a line chart showing total IMC thickness as a function of aging time at 150° C. for an alloy according to the present disclosure and a prior art SAC305 alloy.
Figure 18:
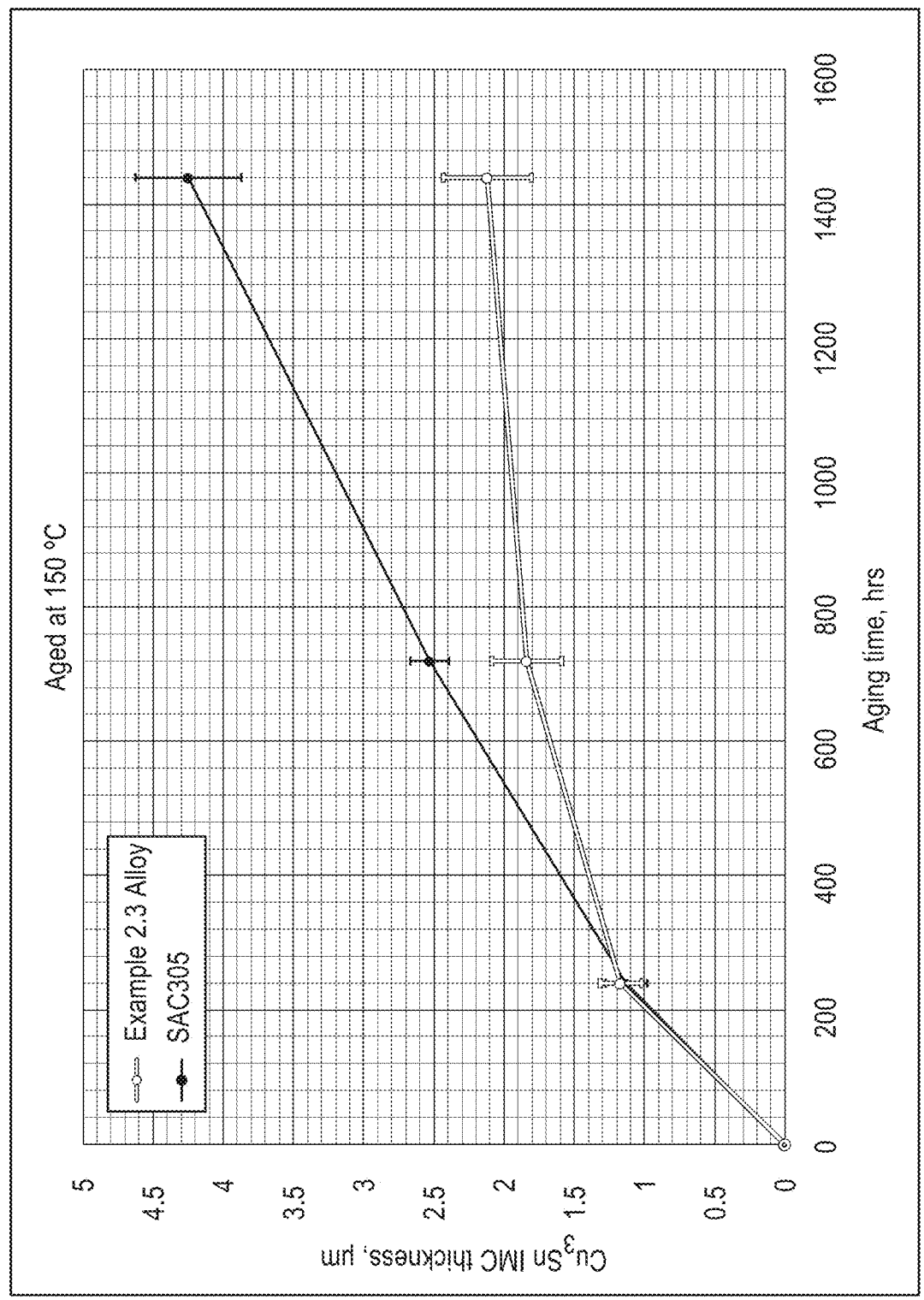
FIG. 18 is a line chart showing $Cu_3Sn$ IMC thickness as a function of aging time at 150° C. for an alloy according to the present disclosure and a prior art SAC305 alloy.

FIGS. 16A and 16B show a comparison between the IMC layer growth of the Example 2.3 alloy and a SAC305 alloy after aging at 150° C. for up to 1440 hours. As can be seen in these figures, both the Example 2.3 alloy and the SAC305 alloy exhibit IMC layer growth. However, the SAC305 alloy shows signs of brittleness, as shown by the presence of Kirkendall voids (for example, after aging for 720 hours). Both alloys show formation of $Cu_6Sn_5$ and $Cu_3Sn$ layers at the boundary between the solder and the copper substrate. FIG. 17 shows the total IMC thickness as a function of aging time. As shown in FIG. 17, the IMC layer for the SAC305 alloy is much thicker than for the Example 2.3 alloy. The addition of microalloys to refine the microstructure may limit diffusion, thus also limiting total IMC growth. The lower IMC thickness in the Example 2.3 alloy likely makes the Example 2.3 alloy suitable for a longer life application at elevated temperatures. FIG. 18 shows the total $Cu_3Sn$ thickness as a function of aging time. At the interface between $Cu_6Sn_5$ and Cu substrate, a new IMC layer of $Cu_3Sn$ forms for both alloys. In the Example 2.3 alloy, the addition of microalloys suppresses the growth of $Cu_3Sn$, which may limit the formation of Kirkendall voids.

Some of the elements described herein are identified explicitly as being optional, while other elements are not identified in this way. Even if not identified as such, it will be noted that, in some embodiments, some of these other elements are not intended to be interpreted as being necessary, and would be understood by one skilled in the art as being optional.

While the present disclosure has been described with reference to certain implementations, it will be understood by those skilled in the art that various changes may be made and equivalents may be substituted without departing from the scope of the present method and/or system. In addition, many modifications may be made to adapt a particular situation or material to the teachings of the present disclosure without departing from its scope. For example, systems, blocks, and/or other components of disclosed examples may be combined, divided, re-arranged, and/or otherwise modified. Therefore, the present disclosure is not limited to the particular implementations disclosed. Instead, the present disclosure will include all implementations falling within the scope of the appended claims, both literally and under the doctrine of equivalents.

The invention claimed is:

1. A lead-free solder alloy consisting of:
   2.4 to 2.6 wt. % silver;
   0.2 to 0.8 wt. % copper;
   1.5 to 5 wt. % bismuth;
   0.001 to 0.2 wt. % cobalt;
   0.03 to 0.07 wt. % antimony; and
   balance tin, together with any unavoidable impurities.

2. The lead-free solder alloy of claim 1, wherein the silver is present at 2.5 wt. %.

3. The lead-free solder alloy of claim 1, wherein the copper is present at 0.5 to 0.8 wt. %.

4. The lead-free solder alloy of claim 3, wherein the copper is present at 0.75 wt. %.

5. The lead-free solder alloy of claim 1, wherein the bismuth is present at 3.0 wt. %.

6. The lead-free solder alloy of claim 1, wherein the cobalt is present at 0.03 to 0.05 wt. %.

7. The lead-free solder alloy of claim 6, wherein the cobalt is present at 0.03 wt. %.

8. The lead-free solder alloy of claim 1, wherein the antimony is present at 0.05 wt. %.

9. The lead-free solder alloy of claim 1, consisting of:
   2.4 to 2.6 wt. % silver;
   0.5 to 0.8 wt. % copper;
   1.5 to 5 wt. % bismuth;
   0.03 to 0.05 wt. % cobalt;
   0.03 to 0.07 wt. % antimony; and
   balance tin, together with any unavoidable impurities.

10. The lead-free solder alloy of claim 1, consisting of:
    2.5 wt. % silver;
    0.75 wt. % copper;
    3.0 wt. % bismuth;
    0.03 wt. % cobalt;
    0.05 wt. % antimony; and
    balance tin, together with any unavoidable impurities.

11. The lead-free solder alloy of claim 1, wherein the bismuth is present at 1.5 to 3.2 wt. %.

12. The lead-free solder alloy of claim 9, wherein the bismuth is present at 1.5 to 3.2 wt. %.

* * * * *